United States Patent [19]

Hekman et al.

[11] Patent Number: 5,037,172
[45] Date of Patent: Aug. 6, 1991

[54] FIBER OPTIC DEVICE WITH A REFLECTIVE NOTCH COUPLER

[75] Inventors: Edwin D. Hekman, Chula Vista; Thomas J. Lund, San Diego; John L. Maida, La Jolla; Deepak Varshneya, Del Mar, all of Calif.

[73] Assignee: Teledyne Industry, Inc., Los Angeles, Calif.

[21] Appl. No.: 626,235

[22] Filed: Dec. 11, 1990

Related U.S. Application Data

[63] Continuation of Ser. No. 326,965, Mar. 22, 1989, abandoned.

[51] Int. Cl.⁵ .............................................. G02B 6/26
[52] U.S. Cl. .................................. 385/31; 385/123
[58] Field of Search ............... 350/96.10, 96.15, 96.16, 350/96.20, 96.29, 96.30; 250/227, 227.11, 227.14, 227.24; 369/44, 45, 46

[56] References Cited

U.S. PATENT DOCUMENTS

| | | | |
|---|---|---|---|
| 4,173,390 | 11/1979 | Käch | 350/96.16 |
| 4,307,932 | 12/1981 | Winzer | 350/96.15 |
| 4,333,009 | 6/1982 | Stevens | 250/237 |
| 4,346,961 | 8/1982 | Porter | 350/96.16 |
| 4,356,395 | 10/1982 | Miller | 250/227 |
| 4,549,782 | 10/1985 | Miller | 350/96.16 |
| 4,558,920 | 12/1985 | Newton et al. | 350/96.15 |
| 4,676,584 | 6/1987 | Perlin | 350/96.15 |
| 4,717,226 | 1/1988 | Mori | 350/96.10 |
| 4,863,229 | 9/1989 | Yasui | 350/96.10 |
| 4,872,739 | 10/1989 | Kahn et al. | 350/96.16 |

OTHER PUBLICATIONS

Interim Report Number TRE/SD104865-1 for Teledyne Ryan Electronics dated Jul. 25, 1986, Army Contract DAAJ02-85-C-0051, pp. 4-1 to 4-16.
Eigth-Terminal, Bidirectional, Fiber Optic Trunk Data Bus, Nov. 15, 1975, by Daniel E. Altman, Report Number NELC Technical Report 1969 (TR 1969).
Interim Report for an Advanced Optical Position Transducer, Report No. TRE/SD104865-1, Jul. 25, 1986.

Primary Examiner—John D. Lee
Attorney, Agent, or Firm—Baker, Maxham, Jester & Meador

[57] ABSTRACT

A structure and a method of manufacturing a reflective notch coupler for an optical fiber are disclosed. The coupler is formed in an optical fiber by a pair of angled surfaces extending from the cladding of the optical fiber and meeting in the fiber's core to form an indentation in the fiber. One surface is reflectively coated and couples light into and out of the core of the optical fiber.

20 Claims, 12 Drawing Sheets

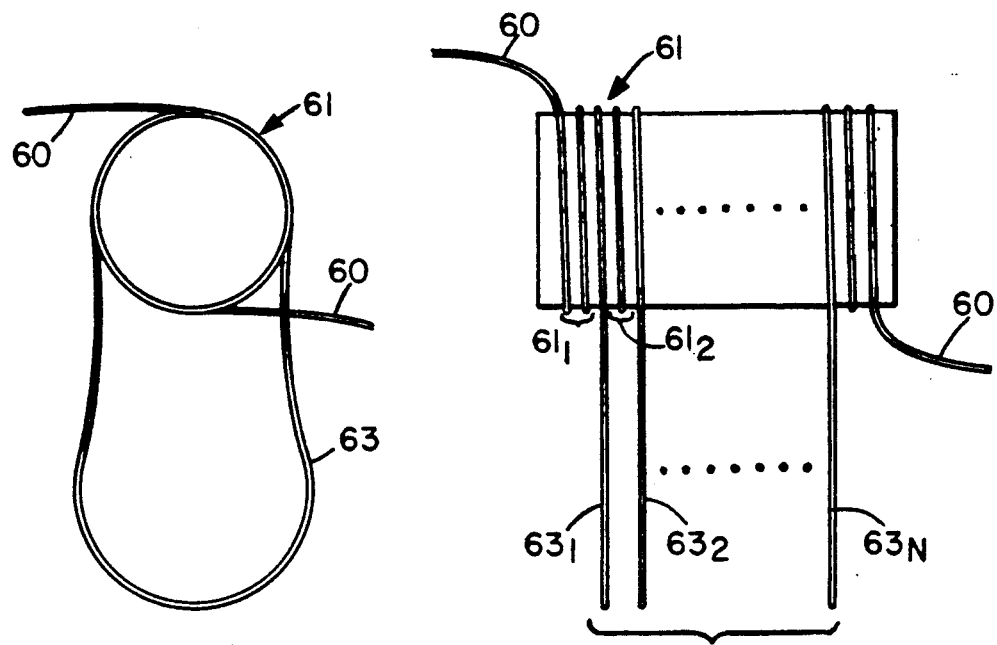
FIG. 6A
FIG. 6B
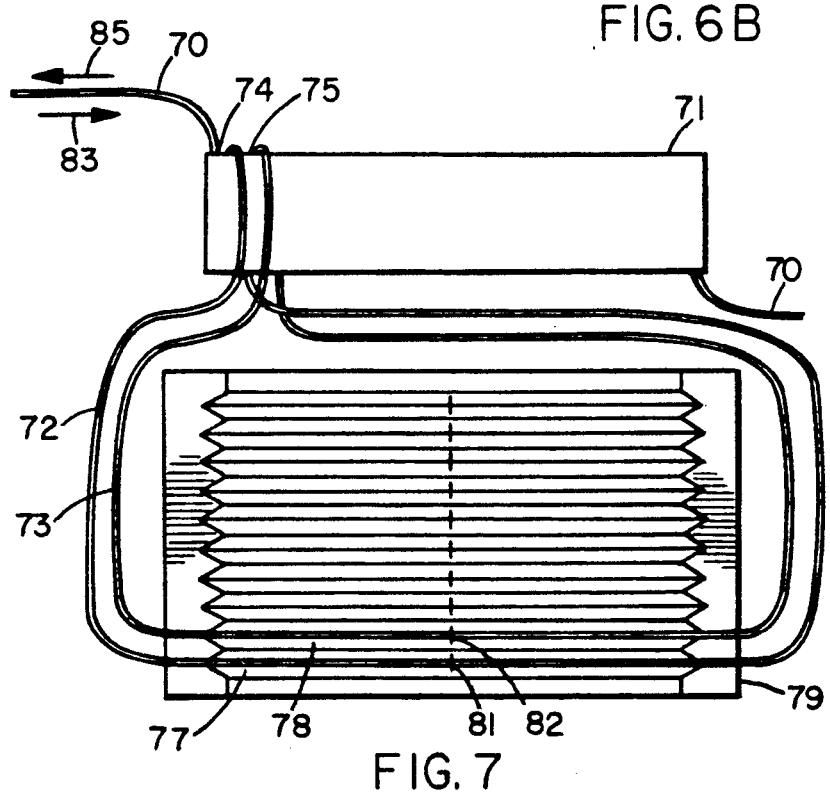
FIG. 7
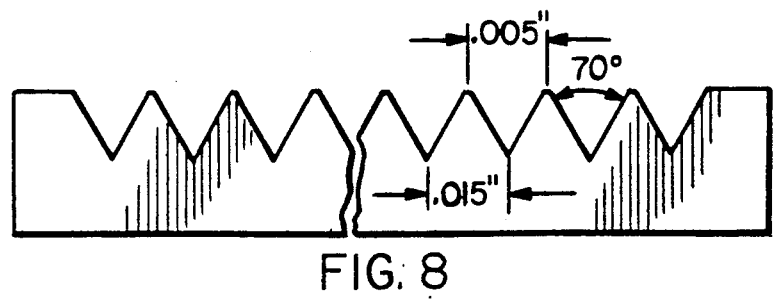
FIG. 8

$$c_i = \frac{c_{i-1}}{(1-c_{i-1})^2 D^2 E^2} \quad (1a)$$

$$c_i = \frac{a - \sqrt{a^2 - 4}}{2} \quad (1b)$$

$$a = \frac{1 + 2 D^2 E^2 c_{i-1}}{D^2 E^2 c_{i-1}}$$

$$(RT\ LOSS)_i = c_i D^2 E^2 \prod_{j=1}^{i-1} \left[(1-c_j)^2 D^2 E^2\right] \quad (2)$$

$$c_i = \frac{A_P}{\pi r^2} \quad (3)$$

$$A_{Pi} = \left[r^2 \cos^{-1}\frac{(r-h_i)}{r}\right] - \left[(r-h_i)(2rh_i - h_i^2)^{1/2}\right]$$

FIBER OPTIC DEVICE WITH A REFLECTIVE NOTCH COUPLER

This is a continuation of application Ser. No. 326,965, filed Mar. 22, 1989, abandoned.

BACKGROUND OF THE INVENTION

The invention is in the field of fiber optic technology, and particularly concerns the structure, operation, and manufacture off reflective notch couplers in an optical fiber. More specifically, the invention relates to the structure, operation, and manufacture of a fiber optic position sensor incorporating an optical fiber with a series of optical delay elements among which are interspersed a series of reflective optical couplers to form a time division multiplexing telemetry device.

Use of fiber optic technology to obtain an optical position signal from an optically-encoded surface is benefitted by an optical sensor structure which returns the optical sensor signal in the form of a multiplexed signal. Whether such a signal is time-multiplexed or positioned-multiplexed depends upon the structure of the fiber optic sensor. In this regard, it is asserted that optical position information is generated by means of the interaction of an optically-encoded surface which is illuminated in such a manner as to provide a set of digital optical signals indicative of the position of the surface. Such coding may be, for example, in the form of a pattern of reflective and non-reflective areas forming a Gray scale code. The surface is illuminated and a plurality of optical signals are developed from this illumination, the signals being either "on" or "off" according to whether the Grey scale bit is active or inactive. The plurality of optical signals making up the Gray scale code can be conducted in parallel through an equal number of optical fiber paths, each dedicated to transmission of one bit position of the code from the coded surface to a sensor processor. This arrangement is essentially "position-multiplexing" in which each code bit is represented by optical energy present or absent in a corresponding optical fiber.

Alternatively, the bits may be introduced into a single fiber in a time sequence corresponding with the magnitude sequence of the bits. Relatedly, this time-multiplexing of code bits requires a means for coupling the bits in a time sequence into the single fiber channel which conducts the bits from the coded surface to the sensor processor.

It will be evident to those skilled in the art that time-multiplexing of a set of digital signals into a single fiber could be provided by a single coupling mechanism which is mechanically scanned in a predetermined fashion across the optical encoded surface in much the same manner as a television signal is generated.

However, it is known that the reliability, accuracy, and costs of a sensor are all diminished by moving parts. One way to eliminate a scanning mechanism in an optical sensor is to provide a separate coupler for each code channel and to activate each of the couplers in a sequence corresponding to the significance sequence of the optical code.

Prior art fiber optic technology does provide the means to construct a series of individual couplers, each of which is capable of coupling a respective bit of an optical position code into a single fiber. Such prior art couplers include, for example, bi-conical tapered couplers and evanescent couplers. However, each of these couplers has a significant size which, when replicated by the number of code bits, make miniaturization of an optical sensor impractical.

Other prior art couplers contemplate the severing of an optical fiber, the insertion of a coupling mechanism between the severed ends, and the attachment of the severed ends to the coupling mechanism. These couplers, however, introduce significant excess losses into the optical fiber, and amplify the complexity and cost of sensor manufacture.

Therefore, there is an evident need for an optical coupler design which will operate to efficiently couple an optical signal into an optical fiber, yet which yields a coupler that is small and easy to manufacture.

SUMMARY OF THE INVENTION

The need for a miniaturized, easily manufactured fiber coupler is based upon an reflective notch in an optical fiber, the notch having two faces and a notch depth which extends from the cladding toward the central axis in the core of an optical fiber. One of the notch surfaces has a non-orthogonal angle with respect to the fiber core central axis and is made reflective, thereby providing a means to reflectively couple an optical signal into or out of the optical fiber. In the embodiments of the invention which require a plurality of couplers, an optical fiber has a succession of spaced notches formed in the fiber at periodically spaced points. These reflective notch couplers are activated in sequence by a pulse of light which is transmitted in a first direction through the optical fiber. The optical power of the pulse is reflectively coupled from the fiber as the optical pulse is propagated past the sequence of reflective notch couplers. This provides a sequence of illuminating pulses which sequentially illuminate the optical code tracks of a coded surface. If the instant position of the coded surface places a reflectively coded area in the field of view of a reflective notch coupler, a portion of the optical power is reflected back to the reflective notch surface, which couples the light back into the fiber, propagating in a direction opposite that in which the illuminating pulse travels. In this manner, a sequence of return pulses will form a time multiplexed optical signal indicative of the position of the coded surface.

Preferably, the invention concerns a fiber optic coupler including an optical fiber for conducting an illuminating optical signal in a first direction, the fiber including an elongate core with a central axis and a cladding on the outside of the core. An optically reflective first surface in the fiber extends from the cladding into the core at a non-orthogonal first angle with respect to the central axis. An optically transmissive second surface in the fiber extends from the cladding into the core and meets the first surface in the core to form an indentation in the fiber, the indentation extending from the cladding into the core of the fiber.

When the optical fiber has a plurality of reflective notch couplers, the invention is expressed as an optical transmission mechanism, including an optical fiber for conducting an illuminating optical signal from an entry aperture in the optical fiber and a plurality of optical delay elements in series in the optical fiber. Each delay element delays the optical fiber. A plurality of optical couplers are provided in series in the optical fiber, the optical couplers alternating with the optical delay elements in the fiber. Each of the optical couplers includes an optically reflective first surface in the fiber extending from the cladding into the core of the fiber. The first surface has a non-orthogonal first angle with respect to the central axis. The coupler further includes an optically transmissive second surface in the fiber extending from the cladding to the core, the second surface meeting the first surface in the core to form an indentation in the fiber, the indentation extending from the cladding into the core of the fiber.

Last, the invention includes an optical read head for reading optical signals from an optically-encoded surface, the optically encoded surface including a plurality of substantially parallel (straight/circular) code tracks in each of which an optical code is represented by optically reflective surface portions alternating with optically non-reflective surface portions. The optical read head includes a carrier piece which is planar or has a plurality of alignment grooves that are disposed in an arrangement corresponding to the coding tracks. The read head further includes a single fiber coiled into an elongate cylinder in which a plurality of fiber loops are extended out from the cylinder, each of the fiber loops being attached to the carrier by being held in a respective one of the alignment grooves by special glass-/ceramic bonding technology. An optical coupler is provided in each of the fiber loops at a location on the carrier adjacent the respective groove in which the fiber loop is held. Each of the optical couplers includes an optically encoded reflective first surface in the fiber extending from the cladding into the core, the optically reflective surface having a non-orthogonal first angle with respect to the central axis of the fiber core. The coupler further includes an optically transmissive second surface in the fiber extending from the cladding to the core, the second surface meeting the first surface in the core to form an indentation in the fiber, the indentation extending from the cladding into the core of the fiber.

The invention includes the method of manufacturing an optical coupler in an optical fiber, the optical fiber including a core with a central axis and cladding applied to the core. The method includes the steps of forming a notch in the optical fiber, the notch extending through the cladding into the core of the optical fiber. The notch includes a first and a second surface, the first surface having a non-orthogonal angle with respect to the central axis. Last, an optically reflective material is attached to substantially all of the first surface.

The invention is further expressed as a method of manufacturing a plurality of optical couplers in a single optical fiber, the optical fiber including a core with a radius r and a central axis, and cladding applied to the core. The method includes the steps of arranging the optical fiber into N elongate, substantially parallel sections. Then, in each of the N sections, a notch is formed for output coupling a portion C of light traveling in the fiber, each notch extending through the cladding and into the core of the optical fiber, and each notch including a first surface and a second surface, the first surface having a non-orthogonal angle with respect to the central axis. Last, in the ith section of the N sections, the step of forming the notch includes forming a notch having a depth $h_i$, wherein:

$$C_i = \frac{1}{2}\{b_i r - p_i(r - h_i)\}\pi r^2$$

wherein:
$p_i = \{4(2h_i r - h_i^2)\}^{\frac{1}{2}}$
and $b_i = 2r \arctan\{(2rh_i - h_i^2)^{\frac{1}{2}}/(r - h_i)\}$;
and wherein $C_i$ is related to $C_{i-1}$ by:

$$C_i = \frac{C_{(i-1)}}{(1 - C_{(i-1)})^2 D^2 E^2}$$

or $C_i = \dfrac{a - \sqrt{a^2 - 4}}{2}$ where $a = \dfrac{1 + 2D^2 E^2 C_{i-1}}{D^2 E^2 C_{i-1}}$ where D & E are delay line & excess losses, respectively, and, last, forming an optically reflective surface on the first surface of each notch.

The primary objective of this invention is to provide a miniaturized mechanism which will efficiently and effectively couple light into and out of an optical fiber.

A further objective of this invention is to provide a method for manufacture of a miniaturized coupler which effectively and efficiently couples light into and out of an optical fiber.

These objects and other objects and distinct advantages of the invention will become evident when the following description is read with reference to the below-described drawings.

BRIEF DESCRIPTION OF THE DRAWINGS

FIGS. 6A and 6B are, respectively, the front and side views of a coiled optical fiber with extending loops.

FIG. 7 illustrates the basic components of the fiber optic read head utilizing a reflective notch coupler and including the coiled optical fiber of FIGS. 6A and 6B and a grooved silicon carrier.

FIG. 8 is view from the front illustrating grooves in the silicon carrier of FIG. 7.

DETAILED DESCRIPTION OF THE PREFERRED EMBODIMENTS

Figure 1:
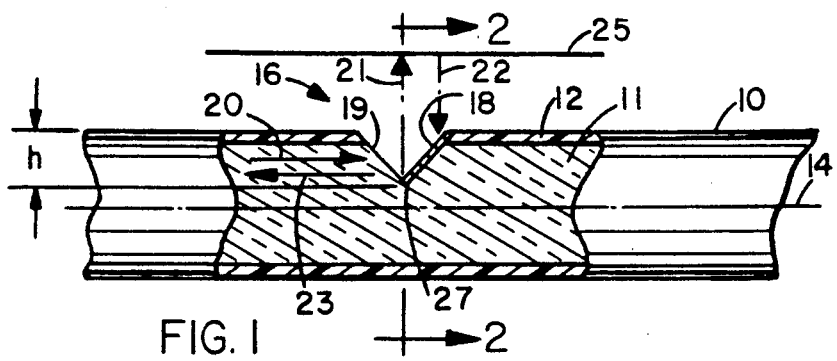
FIG. 1 is a magnified side sectional view of an optical fiber in which a reflective notch coupler has been formed according to the invention.
Figure 3:
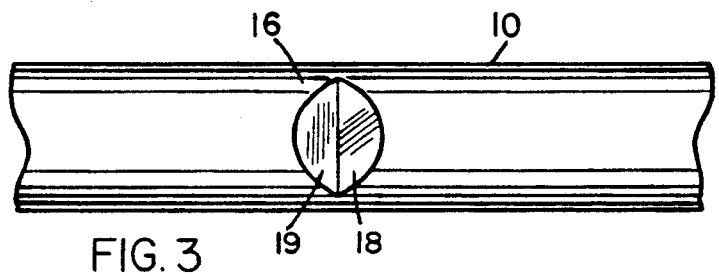
FIG. 3 is a magnified top view of the optical fiber of FIG. 1 with the reflective notch coupler of the invention.

In FIGS. 1 and 3, there is shown an optical fiber 10 including a fused silica core 11. The core 11 is surrounded with a concentric cladding 12 which is doped to provide optical properties known to those skilled in the art. The fiber 10 has a generally elongate cylindrical shape with a central axis 14. The properties of the fiber 10 enable it to conduct an optical signal (light) in either of two directions in the core 11. A reflective notch coupler according to the invention is indicated generally by 16 and includes a first surface 18 and second surface 19. The first and second surfaces meet to form a generally V-shaped cross-section. In the invention, the projection of the first surface 18 toward the central axis forms a non-orthogonal angle with the central axis 14. The first surface 18 is mirrored and is fully reflective of light which is conducted in the core of the fiber 10. The second surface 19 is fully transmissive.

Figure 2:
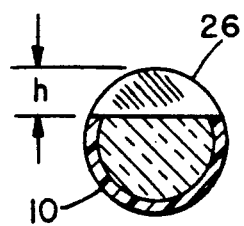
FIG. 2 is a circular sectional area projected by the reflective notch coupler of FIG. 1.

In operation, the coupler illustrated in FIG. 1 operates as follows. Light traveling in the direction indicated by the arrow 20 in the fiber 10 is transmitted through the second surface 19 onto the mirrored surface 18 and is reflected (coupled) thereby from the fiber in the direction of the broken arrow 21. Light from a source internal/external to the fiber 10 and propagating toward the mirrored surface 18 in the direction indicated by the broken line 22 is reflected by the surface 18 through the surface 19 into the fiber, where it is conducted in the direction indicated by the arrow 23. Thus, the reflective notch coupler 16 operates to couple light into and out of the fiber 10. Since the fiber 10 has a generally cylindrical shape, the image projected by the mirrored surface 18 onto a surface located at 25 is an area having the shape of a circular section 26, as indicated in FIG. 2. The height h of the section 26 in FIG. 2 corresponds to the height h of the notch 16 in FIG. 1.

Figure 4:
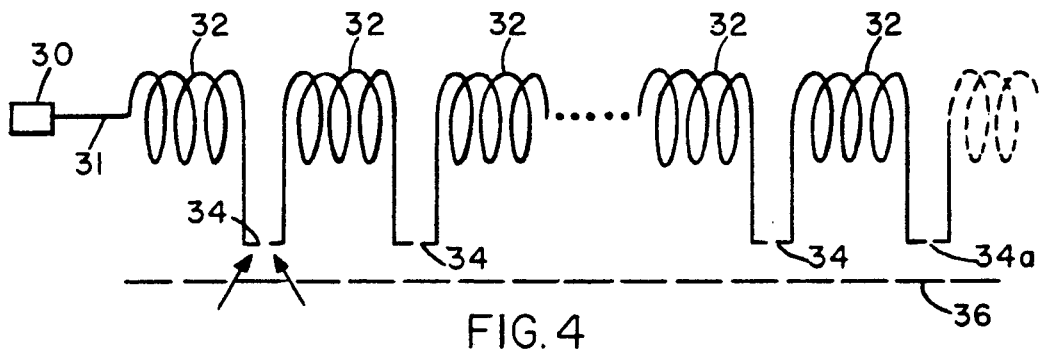
FIG. 4 is a schematic representation of a fiber optic position sensor which incorporates the reflective notch coupler of the invention.

The reflective notch coupler of FIGS. 1–3 is employed usefully in an optical fiber sensor illustrated schematically in FIG. 4. In FIG. 4, an optical transceiver transmits light into, and receives light from, an optical fiber 31. A series of optical delay elements 32 are provided in the optical fiber 31. In practice, the delay elements 32 are excess lengths of the fiber 31, which are illustrated in FIG. 4 as coils. Each of the coils imposes a delay on the propagation of light represented by the time required for the light to travel through the excess length of the coil. Also provided in the optical fiber 31 is a series of reflective notch couplers 34. As FIG. 4 illustrates, the notch couplers 34 are alternated with the delay elements 32 so that light propagating in the fiber 31 from the transceiver 30 encounters a reflective notch coupler 34 immediately after one of the delay elements 32. It will be appreciated that the fiber optic sensor of FIG. 4 comprises a single optical fiber in which the coils and reflective notch filters (which can be wavelength selective) are integral elements.

The fiber of FIG. 4 is enabled to operate as a sensor by provision of a coded optical surface at location 36, and orientation of the reflective notch couplers 34 to face the encoded surface. The arrangement of FIG. 4 operates by decoupling and recoupling time-delayed optical pulses across the continuous optical fiber 31. In this regard, an illuminating optical pulse is injected into the fiber 31 from the transceiver 30 and propagates through the fiber 31 from the transceiver 30 toward the reflective notch coupler 34a. After passing through a delay element 32, a portion of the optical pulse is coupled out of the fiber onto the coded optical surface through a reflective notch coupler. It is asserted that the surface at 36 is reflectively encoded. Thus, the optical code on the surface at 36 is rendered by the presence or absence of one or more reflective areas. The alternating reflective and non-reflective areas forming the code on the surface at 36 are formed into an array of parallel code tracks, each arranged to lie beneath a respective one of the notch couplers 34. When the coded surface at 36 is fixed to a moving object, the arrangement of FIG. 4 becomes a position sensor, with the instant position of the object indicated by a unique set of reflective and non-reflective areas in the code tracks.

Returning to the description of the illuminating pulse, as the pulse passes each reflective notch 34, a portion of its optical power is coupled out of the fiber 31 onto the coded surface at 36. If the portion of the surface underlying the reflective notch coupler has a reflective area, the portion of the illuminating light is reflected back to the notch coupler and thereby into the optical fiber 31. Since the notch coupler couples energy out of the fiber from a pulse, a pulse is reflected back from the coded surface and into the fiber 31 in the form of a pulse. It will be evident that, as the illuminating pulse propagates from the transceiver 30 toward the last reflective notch coupler 34a, a series of reflected pulses would be propagated in the opposite direction toward the transceiver 30. These pulses are referred to as "return" pulses. The minimum separation in time between any two of the return pulses is equivalent to the minimum propagation time through a delay element.

The return pulses propagate through the fiber to the optical transceiver 30, which couples them out of the fiber 31 and provides them for processing.

The reflective surface of the notch filter can be wavelength selective so that light in a certain frequency range would be coupled only from couplers which reflect light in that range.

Figure 5A:
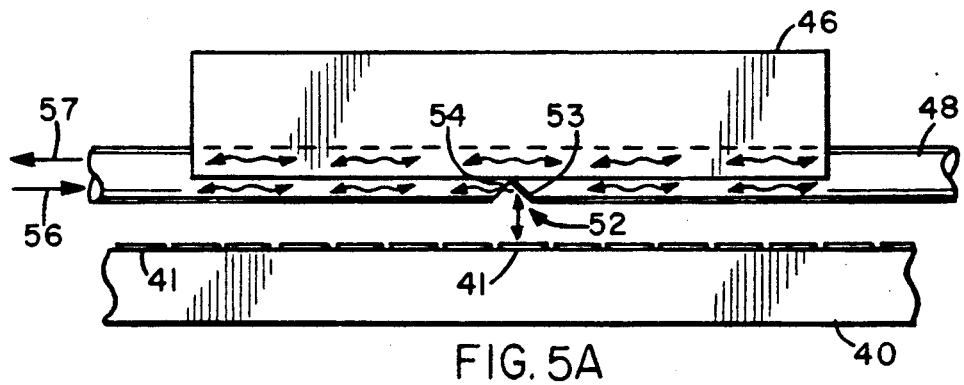
FIGS. 5A and 5B are schematic representations of the mechanical configuration of a portion of a fiber optic read head incorporating the principles of FIGS. 1-4 and the reflective notch coupler of the invention.

A physical embodiment of the fiber optic portion of the sensor schematically illustrated in FIG. 4 is illustrated in FIGS. 5A–7. In FIGS. 5A and 5B, a reflective encoder 40 includes a plurality of optically encoded code tracks. Each code track comprises a sequence of reflective and non-reflective areas, all the code tracks together forming a position code such as a Grey scale code. In FIG. 5A, one code track includes a series of reflective portions, two indicated by 41. In FIG. 5B, the code track of FIG. 5A is illustrated at the left-hand side of the reflective encoder 40, two other tracks being indicated by reflective portions 43 and 44.

A block 46 positions a plurality of reflective notch couplers formed in an optical fiber such that each reflective notch coupler is oriented to face a respective one of the code tracks on the encoder 40. The block 46 includes a series of parallel, elongate grooves 47, each groove for receiving and positioning a section of the optical fiber. The sections are indicated, respectively, by 48, 49, and 50. A reflective notch coupler is formed in each of the sections 48, 49, and 50 with the orientation illustrated in FIG. 5A. In FIG. 5A, the reflective notch 52 includes a reflective surface 53 and a transmissive surface 54. In this orientation, an illuminating pulse is transmitted through the fiber so that it travels in the section 48 in the direction indicated by the arrow 56. If the present position of the encoder 40 positions a reflective portion 41 beneath the coupler 52, a return pulse will be coupled into the fiber section 48 propagating in the direction indicated by the arrow 57.

Figure 5B:
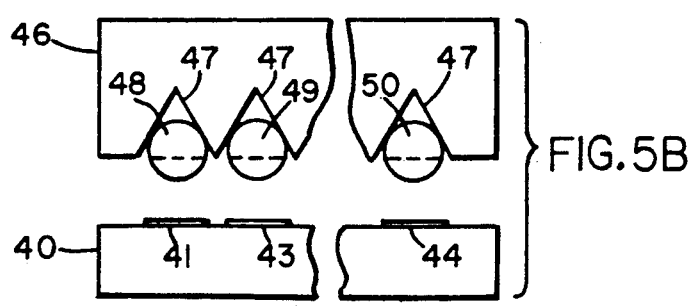

Refer now to FIGS. 6A and 6B for an understanding of an embodiment which incorporates the fiber sections of FIGS. 5A and 5B and the delay elements of FIG. 4 into a single optical fiber. In FIGS. 6A and 6B, a single fiber 60 is conventionally formed into a helically wound coil 61. Intermittently, a long loop of the fiber 60 is extended from the coil 61, one of the loops 63 being illustrated in FIG. 6A as depending from the coil 61. As shown in FIG. 6B, N elongate loops $63_1$–$63_N$ are formed.

As FIG. 6B shows, each of the loops $63_1$–$63_N$ is preceded by a section of coil, two sections being indicated by $61_1$ and $61_2$. In the preferred embodiment, the coil sections $61_2$–$61_N$ include equal lengths of the fiber 60. Resultantly, the delay represented by each of the coil sections is equivalent to the delay represented by any other coil section.

Assembly of the fiber optic read head is illustrated in FIG. 7. In FIG. 7, an optical fiber 70 is formed into a coil 71 with extending loops 72 and 73 alternating with coil delay sections 74 and 75. The loops 72 and 73 are held in grooves 77 and 78, respectively, which are formed in a carrier 79. Reflective notch couplers 81 and 82 are formed in the loops 72 and 73, respectively. With this configuration, the block 79 can be oriented with respect to a reflective encoder, with each of the reflective notches facing a respective code tract of the encoder.

In operation, the fiber optic read head of FIGS. 5A–7 operates based upon the principle of time division multiplexing (TDM). In this regard, an illuminating optic pulse is introduced into the fiber 70 and propagates in the direction 83. The illuminating pulse travels along a continuous series of fiber optic delay elements, each comprising a coil section such as the sections 74 and 75. The optical fiber 70 is periodically tapped between the delay elements 74 and 75 by means of the notch couplers 81 and 82. The notch couplers successively optically interrogate the series of code tracks on a reflectively encoded surface (not shown). After reflection from the encoded surface, the time history of the optical pulse is returned in the fiber in the direction 85 to create the appearance of an N-bit, serially time-shifted binary data word. This data word may have, for example, a modified Gray scale code pattern. Each of the reflective notch couplers 81 and 82 has a respective, geometrically based, tap ratio. A portion of the illuminating optical pulse is coupled out of reflective notch coupler i, the portion being given by the tap ratio $C_i$ of the coupler. Thus, an illuminating pulse will be selectively distributed in time into fractional amplitude components via the tap ratios $C_i$, where i = 1,2,3, ..., N. The stream of return pulses is represented by $C_1(t_1)$, $C_2(t_2)$, ..., $C_N(t_N)$, where $t_i$ represents the time location of return pulse i with respect to all of the other return pulses. In order to reduce the dynamic range requirements of the receiver, with the resultant increase in sensitivity, the tap ratios C are tailored to equalize the magnitudes of the return pulses. The tap ratio $C_i$ is related to the depth, $h_i$, of the notch as given in Appendix A. Further, the time sequence of the return pulses is regular, in that return pulse i has a time delay $t_i$ of:

$$t_i = 2nL_i/c$$

where n is the refractive index of the optical fiber, c is the velocity of light in a vacuum, L is the unit length in meters of any one of the coil sections and i = 1,2,3, ..., N.

METHOD OF FABRICATION

Next, the method of manufacturing a fiber optic read head as described above will be laid out, with particular emphasis on computer numerical control (CNC) for forming reflective notch couplers. In the preferred embodiment, the method produces reflective notches in which each notch surface has a non-orthogonal angle of approximately 45 degrees with respect to the central axis of the fiber in which the notches are being formed.

Initially, a predetermined length of optical fiber is used, for example, 30 meters. The fiber is, preferably, a glass-clad, glass silica fiber to which a concentric buffer comprised of a non-silica material has been applied to impart strength, durability, and environmental survivability to the fiber. Typically, the outside diameter of a buffered fiber is 0.005 inches, or 127 microns. The overall diameter of the unbuffered fiber is 110 microns, with the diameter of the core being 100 microns. Such fibers are "off-the-shelf".

Fabrication of the fiber optic read head begins with winding the buffered fiber on a mandrel of predetermined diameter in the matter illustrated in FIGS. 6A and 6B to provide a fiber coil of predetermined diameter in which N extended loops alternate with N coil sections of equal size.

The extended loops are systematically routed across a planar substrate to align them into a single plane. The reflective notch couplers are formed in the loops after routing on the planar substrate. The notches are machined into the loops on the substrate along a straight line perpendicular to the central axis of the fiber sections, such that each successive reflective notch coupler depth is deeper than the preceding one. This is necessary since, as an illuminating pulse propagates through the loops, the pulse provides less power to be tapped at coupler i than was available at coupler i−1.

As will be described in detail below, the notch depth for a given reflective notch coupler is mathematically determined by an algorithmic relationship solved iteratively for all of the reflective couplers. Thus, the tap ratios C for the couplers are calculated to equalize the magnitudes of the return pulses, according to the numerical methods and relationships given in Appendix A, and the notch depth, h, for a given tap ratio is determined according to Appendix A. Use of these relationships requires determination of an initial tap ratio $C_{13}$, an intrinsic one-way delay element loss per tap D, excess loss due to notch operation and imperfections, E, and the radius of the fiber core, r. From these equations and known values for the variables, the notch height, h, as a function of i is calculated for all notches. Table I shows notch depth, h, (in microns) versus tap number for a one-way delay line loss D of 0.2 dB, and an excess loss E of 0 dB. This table shows an initial depth, $h_{13}$, of approximately 50 microns for a typical D = 0.2 dB, with $C_{13} = 0.5$ and 13 reflective notch couplers.

TABLE I

| TAP # | DEPTH (h) | TAP RATIO | TAP LOSS, dB | TAP OUTPUT, dB |
|---|---|---|---|---|
| 13 | 50.00 | 0.5000 | −17.02 | −10.01 |
| 12 | 30.15 | 0.2539 | −17.02 | −11.48 |
| 11 | 21.96 | 0.1624 | −17.02 | −12.45 |
| 10 | 17.35 | 0.1158 | −17.02 | −13.19 |
| 9 | 14.37 | 0.0879 | −17.02 | −13.79 |

TABLE I-continued

| TAP # | DEPTH (h) | TAP RATIO | TAP LOSS, dB | TAP OUTPUT, dB |
|---|---|---|---|---|
| 8 | 12.22 | 0.0694 | −17.02 | −14.30 |
| 7 | 10.61 | 0.0564 | −17.02 | −14.75 |
| 6 | 9.36 | 0.0467 | −17.02 | −15.16 |
| 5 | 8.33 | 0.0393 | −17.02 | −15.53 |
| 4 | 7.50 | 0.0335 | −17.02 | −15.88 |
| 3 | 6.80 | 0.0288 | −17.02 | −16.21 |
| 2 | 6.17 | 0.0250 | −17.02 | −16.52 |
| 1 | 5.66 | 0.0218 | −17.02 | −16.81 |

The 6 micron notch depth for the first power tap represents a typical value, which can range as much as 2 microns, more or less, depending on intrinsic delay line and excess one-way losses. Physical machining of such small notch depths in the required geometries, with tolerances as low as 0.5 microns, is easily accomplished using the procedures now described.

Initially, an optical fiber is selected from among the variety of fibers available on the market. Various fiber core, clad, and buffer coating diameters and ratios may be used. The particular fiber chosen, however, should have low microbending/macrobending losses when conducting light in the near infrared region is provided from high spatial frequency sources, such as laser diodes. The optical attenuation of the fiber selected can be relatively high with respect to that of standard telecommunication fiber, since only a relatively short link is used. In fact, attenuation-insensitive, ionizing-radiation hardened high OH- fibers which exhibit high attentuation coefficients on the order of 8 to 10 dB per kilometer, unbent can be used also.

The fiber chosen should have a buffer coating that is strong enough to minimize fiber failure problems during handling. Also, it should be soft enough to minimize macrobending-induced microbending loss when placed in a helical configuration to form a coil. The buffer should also function as a hermetic seal with hydrophobic properties to minimize water-induced stress corrosion within the fiber surface micro-crack zones. High temperature resistant properties of the buffer material are necessary if the fiber is used at temperatures exceeding 100° C.

The optical fiber used to construct the fiber optic read head according to the following manufacturing procedure possessed cross-sectional diameters of 100/110/125 micrometers for core, cladding, and buffer, respectively. The fiber was pulled from a Heraeus Fluorosil SS.1 preform with a Suprasil synthetic fused-silica core. The resulting fiber has a theoretical NA of 0.186. The buffer is fabricated from a high-temperature resistant polyimide which is rigid and exhibits a continuous service temperature of approximately 350° C.

Initially, the fiber just described is formed into a coiled helix with extending sections, as described above. The coil is wound on an expanded mandrel, with the extended loops provided periodically in series with coil sections of equal length. To provide ease-of-removal from the mandrel and increased integrity of the fiber coilbody, a thin aluminum metal foil sheath is conformed onto the mandrel prior to the fiber winding. The fiber is then formed into a coil on the foil sheath, following which the foil sheath is bonded to the coil body. After the winding process, the foil sheath remains as an integral part of the coil body. During the process of winding the optical fiber onto the mandrel-mounted foil sheath, continuous winding is halted to allow formation of an extra-coilular loop. The number of loops is equal to the number of reflective notch couplers to be formed in the optical fiber. The fiber is coiled by rotating the mandrel, with each loop being initiated by halting the rotation of the mandrel after winding a length of the fiber necessary to provide a predetermined optical delay. Then, the loop is formed, followed by the next coil section, and so on. As each loop is extended out from the coil, it is folded and temporarily tacked to a disc plate adjacent to the winding mandrel, which rotates with the mandrel and the coil. In the preferred embodiment, an initial length of fiber provides a time delay to allow elimination of connector reflections. This length of the fiber is coiled prior to the first loop. Then, each loop is separated from the following loop by a length of L of coiled fiber which gives the required delay. The process of winding a standard delay length of L and forming a notch loop is then repeated $N-1$ times to complete the alternating series of delay elements and reflective notch couplers. An extra, but not necessary, delay line length can be wound after the Nth loop to separate the "end-of-fiber reflection" in time from the return pulses.

Once the coil is fabricated, the mandrel diameter is contracted and a thin layer of optically curable cement is applied to the outer surface of the coil. The material is applied in a monomer state and is optically cured, causing a solidification of the material and encapsulation of the fibers and the foil sheath. In the preferred embodiment, the optically curable cement used is Norland Optical Adhesive 81. This material consists of a polyurethane-based monomer which hardens by polymerization while being irradiated with ultra-violet energy at between 340 nm and 390 nm.

Figure 9A:
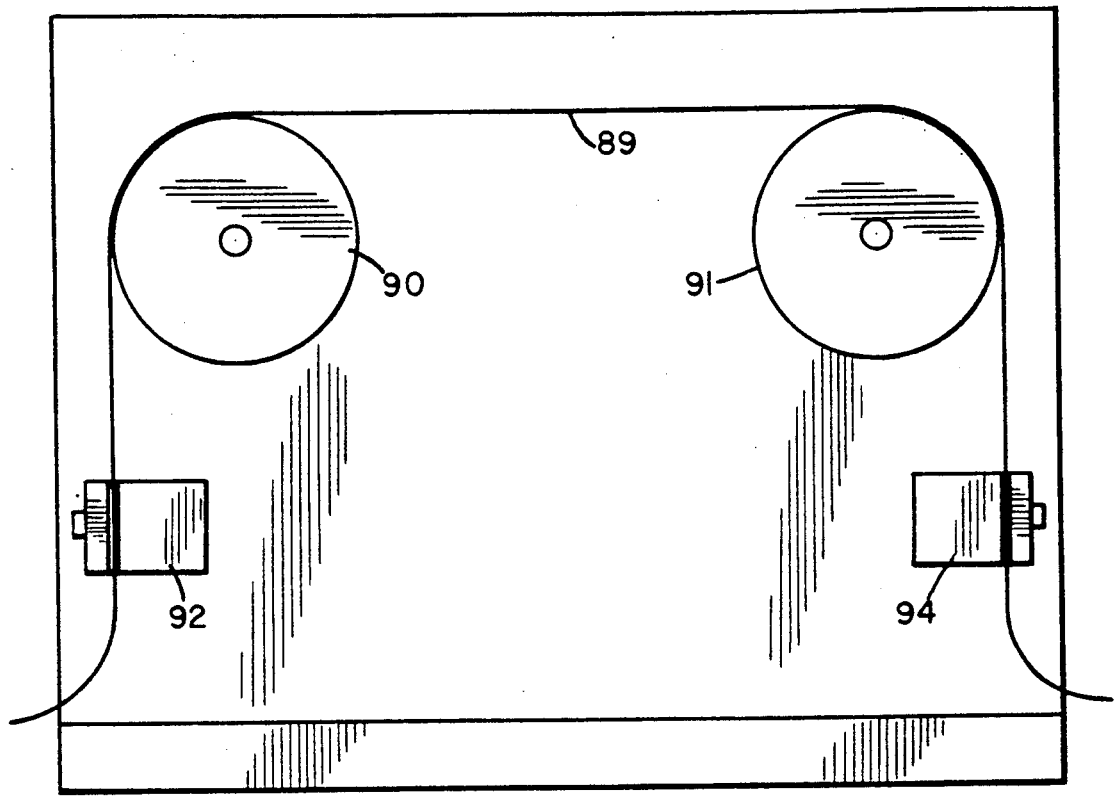
FIGS. 9A-14B illustrate a sequence of steps in a procedure for manufacturing an optical fiber read head which includes forming one or more reflective notch couplers in an optical fiber.
Figure 9B:
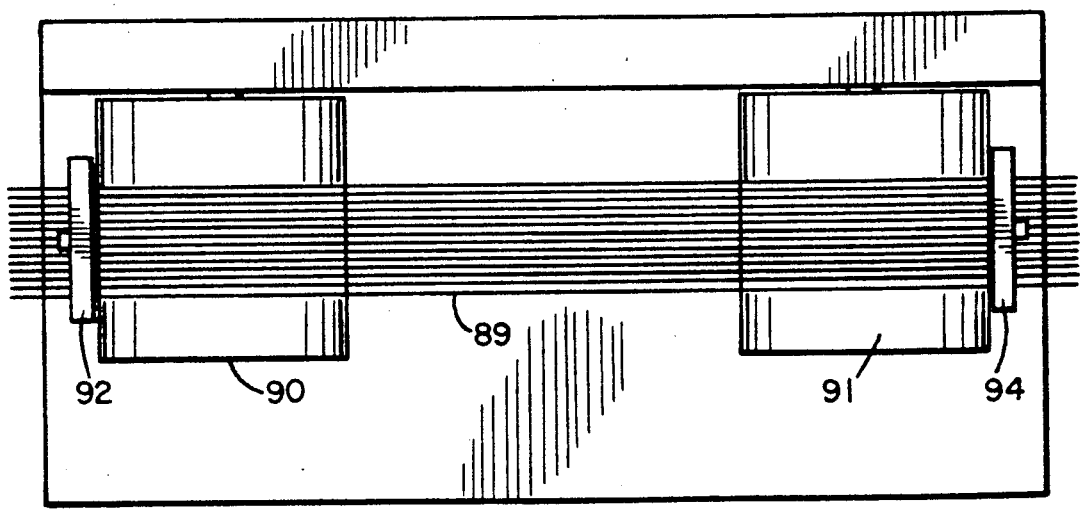

When the coil with the extending loops is removed from the mandrel on which it is wound, the loops are integrated with a "V"-grooved substrate as discussed above with reference to FIG. 7. Initially, a coupler-loop linear array is formed as illustrated in FIGS. 9A and 9B by reference numeral 89. The array consists of the reflective notch coupler loops of the helically coiled fiber. The loops are strung onto frame-mounted, twin, grooved tension mandrels 90 and 91 to produce a one-dimensional ribbon 89 of tautened fibers. The tautened arrangement assures mutually parallel fibers because of the inherent longitudinal tension present in each fiber. The formation of the loop ribbon 89 begins by stringing the first loop into the first extreme groove of each grooved tension mandrel. Subsequent loop stringing is essentially identical to the first, except that each progressive loop is strung onto the next adjacent tension mandrel groove. The progressive stringing procedure is complete when all loops have been strung. The relative fiber loop length remaining on each side of the loop ribbon 89 are clamped in fiber ribbon clamps 92 and 94 to maintain the tension on the loops on the array 89.

Figure 10A:
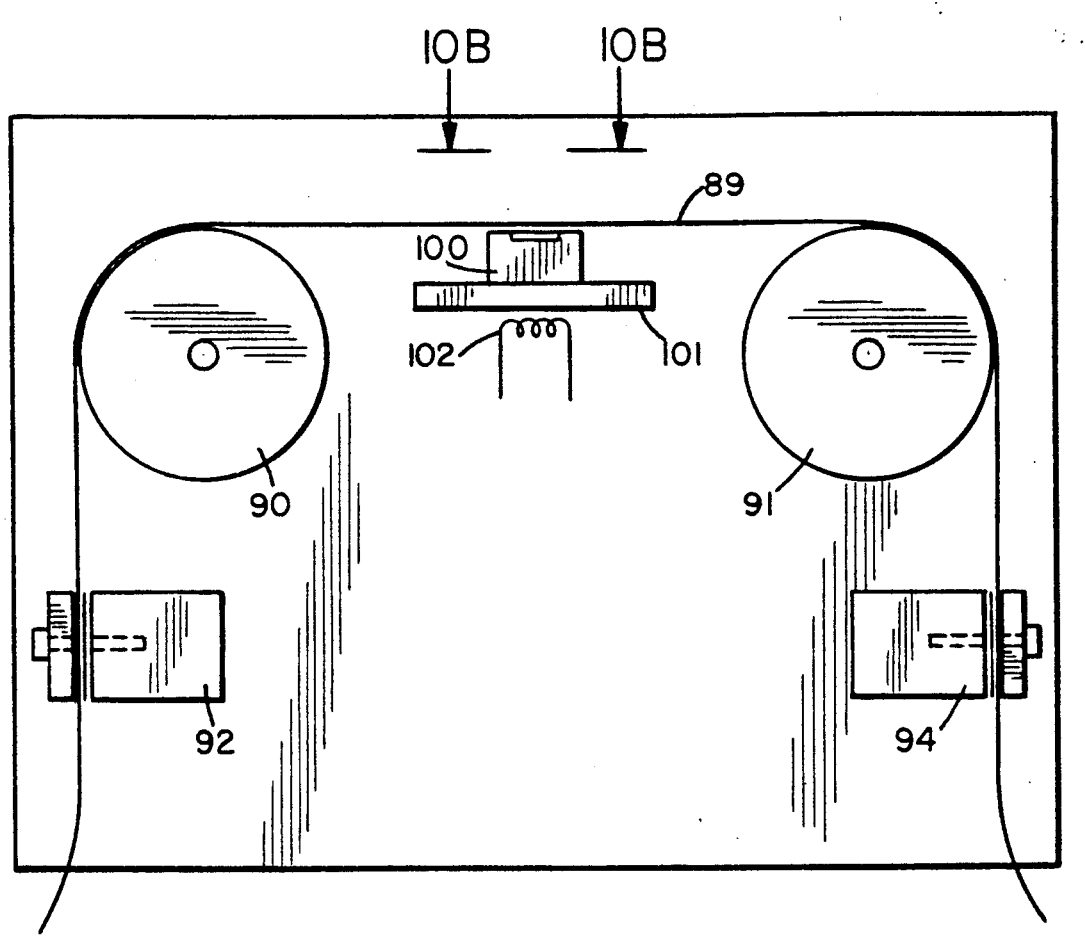
Figure 10B:
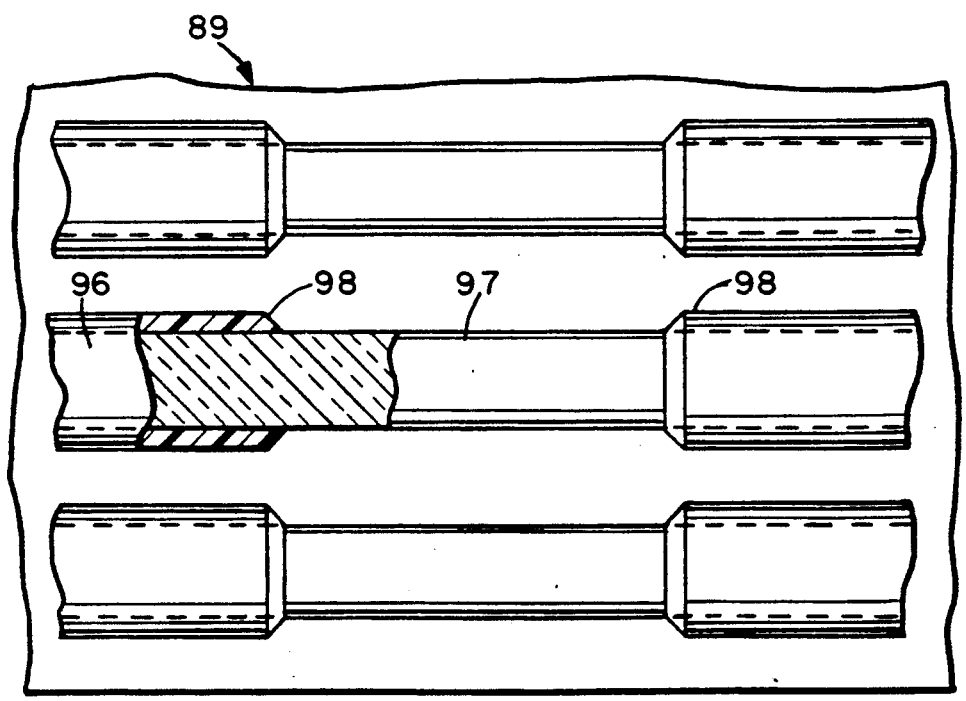

Next, as shown in FIG. 10, the buffer coating is stripped from all of the loops of the ribbon 89 by chemical digestion. This process requires a reaction time dependent upon the particular buffer material, the chemical which consumes the buffer material, and the required reaction temperature. As stated above, the buffer material in the fibers of interest is a polyimide. In this case, the chemical used for debuffering is concentrated sulfuric acid (96% by weight), with the debuffering process conducted in an environment at a temperature of approximately 125° C. to 150° C. In this regard, a hot sulfuric acid bath is contained in a teflon tub 100 which rests upon a stainless steel plate that conducts heat to the sulfuric acid from a heating coil 102. As the acid temperature increases, its chemical reactivity increases also. Thus speeding up the process of buffer digestion. The teflon tub has an aperture which faces the ribbon array in an area referred to as the "bond region", which is magnified at the upper portion of FIG. 10. The result of the debuffering process can be understood with the magnified portion of FIG. 10 by reference to an optical fiber 96 from which the heated sulfuric acid has consumed approximately 0.2 linear inches of buffer coating 98 to expose the outer surface of the fiber cladding 97. All of the fibers in the ribbon 89 are similarly prepared in the bond region by removal of their buffer coatings. The buffer region is contained in a relatively small length of the taunted fiber optic loop array 89 which is centered between the twin tension mandrels 90 and 91.

Next, a grooved substrate is formed conventionally out of a silicon material according to the configurations for the carriers indicated by reference numeral 79 in FIG. 7 and reference numeral 46 in FIGS. 5A and 5B. Carrier substrate preparation is accomplished independently of the fiber preparation process and is primarily concerned with assuring that the axial (length) dimensions of the grooves are correct, that sharp edges are deburred, and the all debris and oil are removed. In this process step, a silicon carrier substrate is prepared from a "mother" substrate having N V-shaped grooves cut into one surface. As shown in FIG. 8, the groove faces are equilateral and meet at an angle of 70°. Each groove's face opening is approximately 0.005 inches, and the grooves are spaced at 0.015 inches. From a "mother" substrate, a carrier substrate is cut. In the preferred embodiment, the carrier substrate is 0.333 inches long, 0.25 inches wide, and 0.020 inches thick. A carrier is cut from a mother substrate by a high-powered frequency-doubled neodymium YAG laser. Laser vaporization is preferred for cutting carrier substrates since it leaves few burrs along the cut edges of the carrier and since subsequent separation along a cut requires low stress. A carrier substrate is finally prepared by subjecting it to an ultrasonic vibration chamber filled with transistor grade acetone to sonically scrub and clean the V-grooved surface. The grooved surface of the substrate is referred to as the "bonding mesa".

Figure 11B:
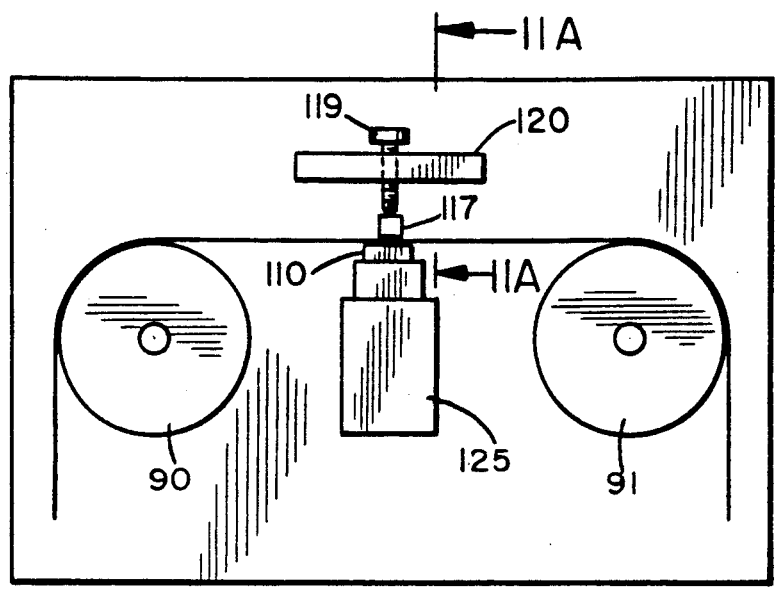
Figure 11A:
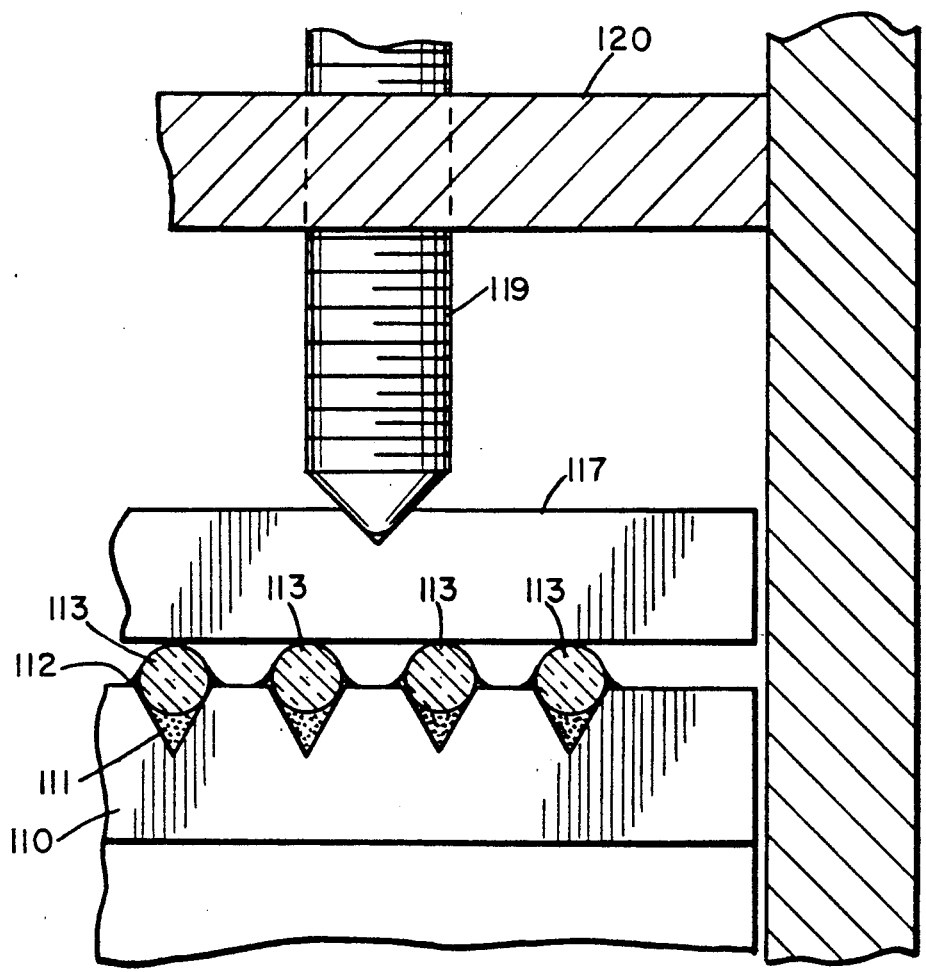

FIGS. 11A and 11B illustrate the step of attaching the bonding area of the fiber loop ribbon to the carrier substrate. In order to bond the exposed silica glass fiber loops to the grooves of the carrier substrate, an intermediate material is necessary. This material is a bonding agent which exhibits thermo-mechanical properties that are similar to both silica glass and silicon. Preferably, the bonding agent is a glass/ceramic cement possessing good high-temperature and chemical resistances, while providing hydrophobic properties to assure long-term mechanical integrity of the exposed fiber loop and silicon surfaces. To reduce the mismatch of the thermo-mechanical properties of the cement with the silicon material of the fiber, the thermal coefficient of expansion of the cement is selected to be midway between the thermal coefficients of expansion of the fiber material and the silicon of which the carrier substrate is fabricated. Proper selection reduces thermally-induced stresses operating between the carrier substrate and the material of which the fiber is fabricated. As shown in FIGS. 11A and 11B, the glass/ceramic cement 111 is applied at room temperature to the carrier substrate 110 so that it fills the grooves of the carrier in the bonding mesa portion. The cement is delivered to the grooves by a spatula/spackling technique. Excess cement is removed along the bonding mesa surface 112, leaving the cement filling in the V-grooves. The cement-filled substrate 110 is then positioned directly beneath the debuffered bonding area of the fiber ribbon 89 and centered. The fibers 113 of the array 89 are aligned with the V-grooves and seated in the grooves.

Alignment of the debuffered bonding region of the fiber loop ribbon 89 with the grooves of the carrier substrate 110 is accomplished by translating the substrate with respect to the ribbon 89 in the x, y, and z directions by a micropositioner (not shown). After alignment, the fibers 113 are seated in the cement-filled grooves by use of a clamping pressure pad 117. The pressure pad is applied directly to the top of the fiber loop ribbon 89 in the bonding region and, after proper placement, it and the fibers are driven towards the bonding mesa surface 112 of the carrier substrate 110 by a pivot-type uniform force-inducing screw 119. The screw threads through a stationary plate 120. In the arrangement of FIGS. 11A and 11B, all of the debuffered fiber loop portions are simultaneously driven into the V-grooves and seat to the identically sloped surfaces of the grooves. Seating of the fiber loop portions 113 displaces an amount of cement material 119 out of each V-groove. This displaced cement material is transported to the bonding mesa surface in the region above the edges of each V-groove where, through adhesive and cohesive properties it maintains contact between a fiber and the bonding mesa surface. This contact provides lateral support, adding strength to the seating of each fiber.

Following alignment and seating of the debuffered fiber loop portions in the V-grooves, the cement material 111 is activated at a temperature exceeding its glass transition temperature. The heating is provided by a thermo-electric heater 125, which raises the ambient temperature in the vicinity of the bonding mesa surface to 475° C. within a couple of minutes, this temperature being maintained for three minutes to drive off the organic species in the cement. The bonding mesa surface is then allowed to cool over a period of twenty minutes prior to proceeding to the next step.

Figure 12A:
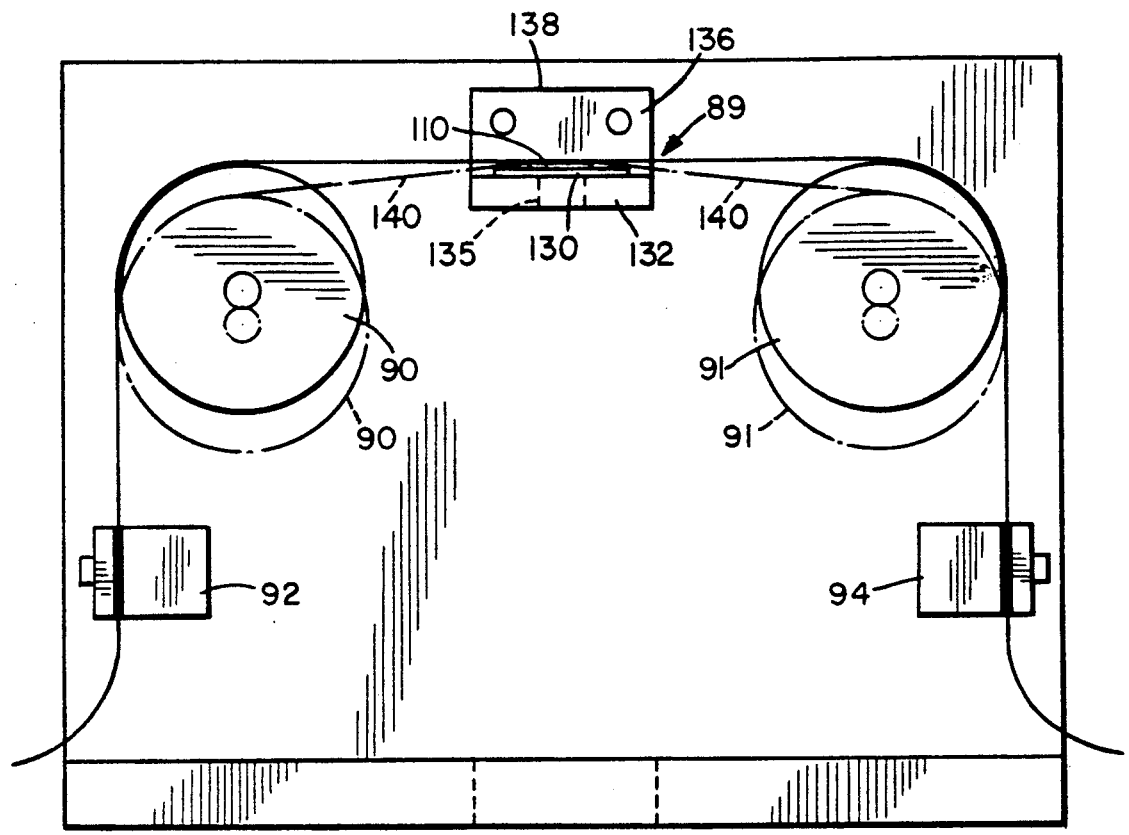
Figure 12B:
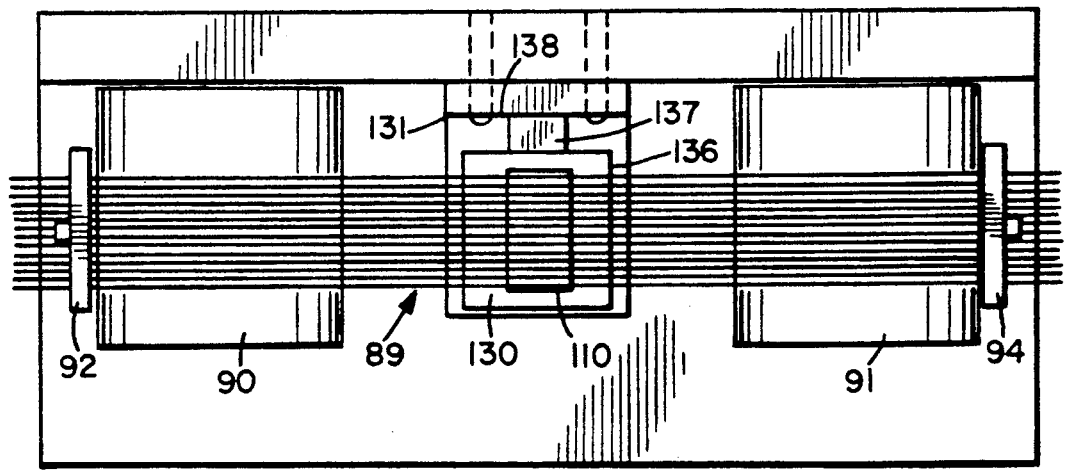
Figure 12C:
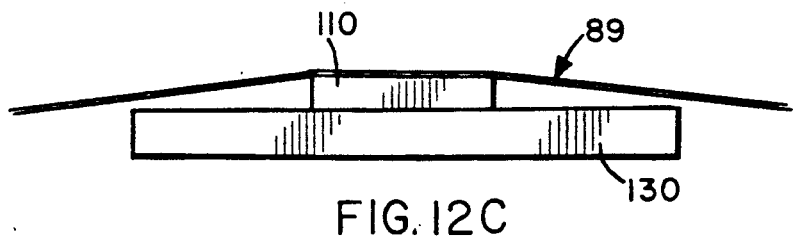

A supplementary support is attached to the under surface of the carrier substrate in a procedure step illustrated in FIGS. 12A-12C. A transparent glass plate 130 is attached to the bottom surface of the carrier substrate 110 by an organic epoxy which cures upon exposure to UV radiation. The glass plate is transparent in order to permit passage of UV radiation to the bonding area between the plate 130 and the carrier substrate 110. The glass plate and cement are applied in a manner which creates an effective tension dead-end and strain relief mechanism for the fiber loops in the glass/ceramic bonding region, and at the edges of the carrier substrate 110. The glass plate 130 also acts as a mechanical support for the substrate itself. The added substrate support is necessary to render the integrated system compatible with conventional handling and clamping technology employed during subsequent machining operations.

Addition of the glass plate 130 is accomplished as illustrated in FIGS. 12A and 12B by the use of a right-angle support fixture 136 which is attached to the frame holding the mandrels 90 an 91. The support fixture 136 allows simultaneous support of the plate 130 and relative alignment of the plate to the carrier substrate 110, once the plate contacts the substrate. The fixture 136 includes a spacer 137 against which the carrier substrate 110 butts. The spacer is aligned with the vertical face 138 of the fixture 136 and, thereby, with the glass plate upper edge 131. Once the glass plate 130 and carrier substrate 110 are centered and aligned, the optically curable cement is applied to the underside of the fiber loop ribbon 89 at the edges of the carrier substrate 110. The cement is allowed to creep into and wet the void between the substrate and the glass plate; upon curing, this forms the bond between the plate and the substrate. Additional cement volume is added to create an extended pool on the underside of the ribbon 89, which fills the void between the plate 130 and the ribbon 89. As shown in FIG. 12C, the edges of the plate 130 are chamfered, which, once the cement is cured, provides strain relief for the fiber loops. After the liquid cement is applied, the trajectory of the fiber loop ribbon 89 is adjusted with respect to the bonding mesa surface of the carrier substrate 110. This is indicated by the dotted lines 140 in FIG. 12A. This trajectory is made slightly negative such that the fiber loop ribbon height, from the glass plate 130, decreases as it progresses away from the carrier substrate 110. This slight negative trajectory of the fiber loops prevents physical interference between the fiber ribbon 89 and the reflective encoder 40.

Last, the cement is exposed to UV energy for curing. The UV source (not shown) is positioned such that its energy propagates normally through the optical window 135 of the support fixture 136. Once the cement is cured, the glass/substrate/fiber assembly the "head assembly" is ready for milling.

The above-described process of using a glass substrate can be eliminated by premachining the silicon substrate in a suitable configuration to resemble the glass/substrate/fiber assembly. In this case, the strain-relieving is accomplished in the same manner described above by applying the organic cement between the fiber ribbon and the edge of the silicon substrate to produce the "mill ready" assembly.

When "mill-ready", the head assembly is removed from the dual mandrel fixture illustrated in FIGS. 9A-12B. In this regard, the fiber loops are unclamped and the head assembly is lifted off of the grooved tension mandrels.

Next is described a machining process for forming the reflective notch couplers in the head assembly assembled thus far. The reflective notch couplers are formed in colinear alignment in the bonding area region of the debuffered fiber loops by a process and means based upon a computer numerical control (CNC) mill. This mill combines traditional macroscopic grinding, facing, and lapping technologies with modern microscopic grinding, polishing, and computerized precision positioning technologies.

Figure 13A:
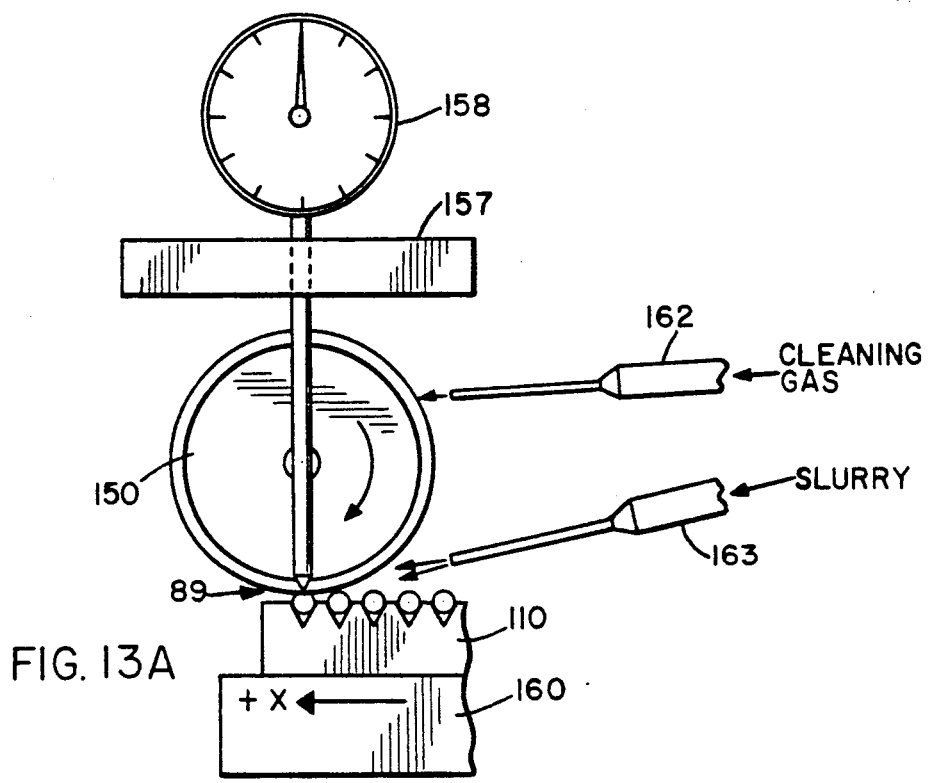
Figure 13B:
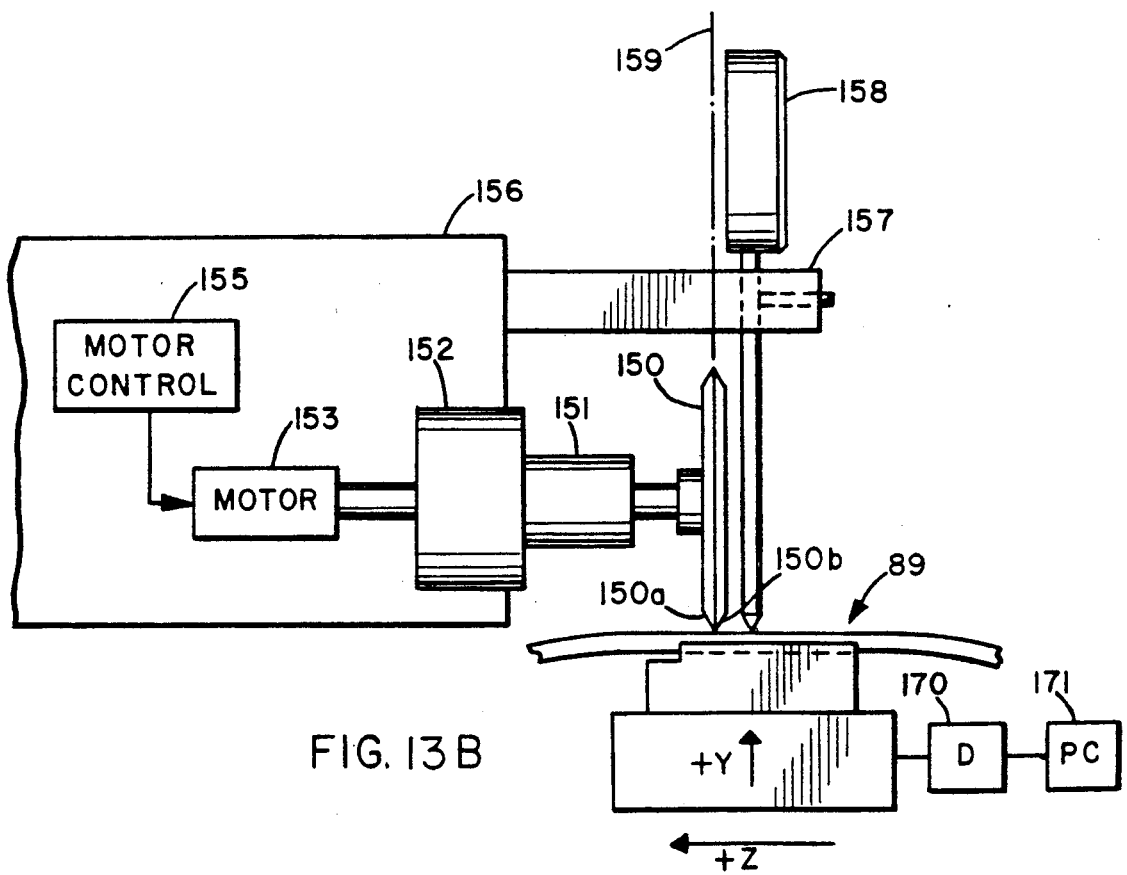

The notch milling setup is illustrated in FIGS. 13A and 13B and includes a circular knife 150 attached to a rotating shaft 151 which is journaled to thrust bearings 152 and rotated by a motor 153. The motor is controlled by conventional motor controller 155, with the bearings, motor, and controller all contained within a housing 156. A reference plate 157 is attached to the outside of the housing 156, abutting the thrust bearing 152. The reference plate has mounted on it a fiber position indicator 158, the center of which coincides with the center of the knife shaft. The head assembly 149 with the attached fiber loop ribbon 89 is mounted on a positioning mechanism including a holding chuck 160 whose position is computer controlled in the x and y direction and manually controlled in the z direction. The circular knife is viewed from the front in FIG. 13A and from the side in FIG. 13B. A first jet 162 faces the circular blade 150 for the introduction of a cleansing gas on the blade. A second jet 163 is directed toward the blade and the head assembly 149 to direct a stream of slurry.

The notches for the reflective notch couplers are machined into the head assembly 149 in a process involving moving the chuck 160 with the mounted head assembly 149 through a single pass under the circular cutting knife 150. The knife removes precise amounts of glass from the side of each debuffered fiber loop portion as the head assembly 149 is moved on the holding chuck 160 past the. rotating blade 150. A liquid slurry is injected from the jet 163 onto the knife and the head as the milling process commences, to allow proper material removal, optical quality facing of the notched surfaces, and lubrication.

The rotation rate of the knife 150 is manually adjustable. The motion or translation of the head 149, however, is controlled in the x and y axes by a stepper motor driver 170 controlled by a computer 171. The stepper motor, under control of the computer 171 controls the positioning assembly which carries the holding chuck 160.

Actuation of the holding chuck assembly 160 in the x direction is by the stepper motor drive which continuously moves the holding chuck 160. Motion in this direction advances the head 149 such that each consecutive fiber is fed under the rotating knife 150. Actuation of the head in the y direction is also by way of the stepper motor drive. Motion in this direction advances the head and fiber such that each consecutive notch aperture is machined deeper than the last. Actuation of the head in the z direction is by way of a conventional manual drive (not shown). Motion in this direction advances the head 149 so that the mid-point of the exposed fibers in the silicon substrate can be aligned with respect to the indicator 158.

The control of stepper motor drive 170 is by a drive motor controller 171 in the form of a conventional computer programmed with a predetermined numerical representation of the per-fiber-loop notch depth $h_i$ calculated as described above. The numerical representation is stored in a conventional external floppy memory connected to the controller 171. Menu driven software in the controller 171 retrieves the notch profile from the memory and, by way of an internal real-time clock unit, transmits pulses to the x and y axes stepper motor drive circuitry 170. These pulses are spaced in time and represent a feed rate signal for each axis. Each pulse of the x axis translates the head assembly 149 by one micron in the positive x direction indicated in FIG. 13A, while each pulse of the y axis translates the head assembly 149 by 0.1 micron in the positive y direction, as indicated in FIG. 13B.

The mill illustrated in FIGS. 13A and 13B is prepared by positioning the holding chuck 160 such that the space between the circular knife 150 and the chuck 160 is sufficient to allow definition and shaping of the edges 15a and 15b of the knife 150 to a preferred 45°/45° configuration. To accomplish this, a high-speed diamond impregnated wheel and motor assembly (not shown) is used which can mount the impregnated wheel plus or minus 45° from the plane 159 of the circular knife 150. The diamond impregnated wheel is brought to the proper angle with respect to the circular knife plane 159 and rotated against the edge of the knife 150 to define and sharpen. The knife is rotated on the shaft 151 during this procedure to assure concentricity and flatness of the knife faces with respect to its axis of rotation along the shaft 151. Once the knife 150 is sharpened, the diamond impregnated wheel and motor assembly is removed and the jets 162 and 163 are positioned to be co-planar with the circular knife plane 59. Preferably, the circular knife 150 is of high carbon steel and is polished with diamond grinding polishing compounds.

Figure 14A:
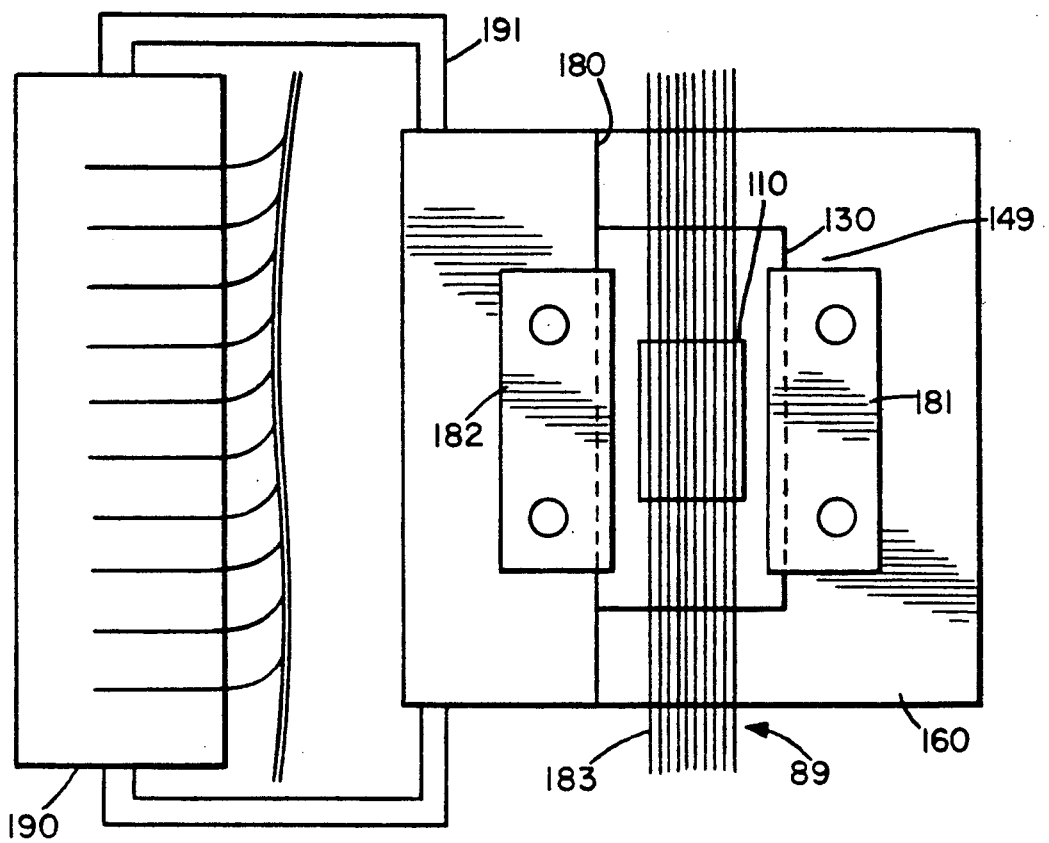
Figure 14B:
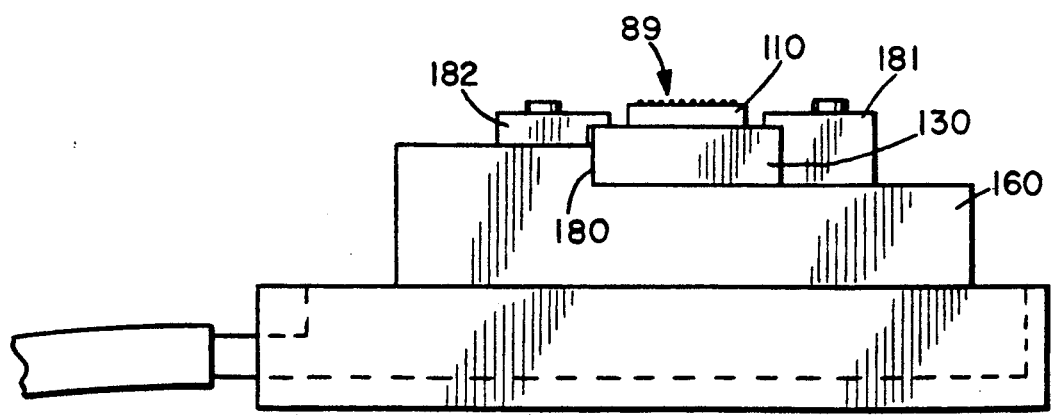

The loading of the head assembly 149 into the mill of FIGS. 13A and 13B by way of holding chuck 160 is illustrated in more detail in FIGS. 14A and 14B. The head assembly 149 is placed on the chuck against a right-angle alignment edge 180. The head assembly 149 is clamped to the chuck 160 by clamps 181 and 182. The body of the coil 190 from which the loops depend is attached and suspended from the side of the chuck 160 by suspension wire 191.

Figure 16B:
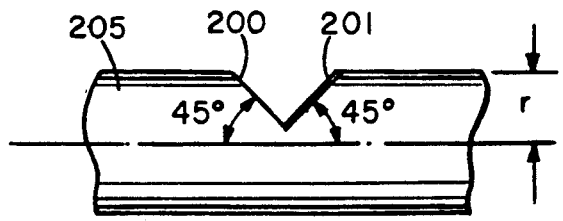

Before notch machining commences, x and y zero references must be established for the mill of FIGS. 13A and 13B. These references are established with respect to the first fiber 183 in FIG. 14A of the head assembly 149. The first fiber 183 is located closest to the reference edge 180 of the chuck 160. The zero reference for the x axis (FIG. 13A) is first established, following which the y axis reference is established. To define the zero point for the x axis reference, the reference plate 157 and reference peak indicator 158 are used. After attachment of the chuck 160 to the mill of FIGS. 13A and 13B, the x, y, and z axes are translated to position the first fiber 183 such that it is in contact with the fiber peak indicator 158. This point of contact is that which will subsequently be the first landing point of the circular knife 150 and, consequently, the y=0 landing point. To define the x=0 reference point, the x axis is actuated incrementally, in both directions. This can be accomplished initially by a manual stepper motor push-button control (not shown) which actuates the stepper motor drive 170. This is done while visually monitoring the fiber peak indicator 158. Once the peak of the first fiber is established, the x axis electronic register in the drive motor controller 171 is cleared to zero. Next, each successive fiber peak height is determined with respect to the first fiber using both the indicator and the x axis controller. This peak height difference for each fiber is used to modify the stored notch depth profile file in the floppy memory. This is necessary for correcting fiber peak offsets due to head assembly 149 fabrication errors induced by now parallel surfaces between the chuck 160, glass plate 130 and carrier substrate 110 of FIGS. 16A and 16B. Finding the y=0 point requires lowering the chuck 160 on the y axis to mechanically decouple the fiber peak indicator 158 from the first fiber, following which the indicator and reference plate 157 are removed. Once the indicator and plate are removed, the z-axis is translated manually by an amount equaling the distance separation between the circular knife plane 159 and the center of the fiber peak indicator in the direction of the knife plane 159. This positions the former point of contact on the first fiber 183 directly under the circular knife 150. Since the former position of the fiber peak indicator 158 was aligned with the axis of rotation of the circular knife, the tangent line of the first fiber peak is parallel to the minimum point tangent line of the circular knife 150. This, in effect, establishes that the landing point of the knife will be the first fiber peak.

The y=0 landing point is found by incrementally raising the chuck 160 along the y axis while visually checking for formation of debris caused by contact between the circular knife and the first fiber. This can be accomplished, for example, by a medium power microscope and right angle ray deflector mirror (neither shown) providing a magnified view of the interface between the circular knife 150 and the first fiber 183. When debris formation is noted, the y axis electronic register of the drive motor controller 171 is zeroed, thereby setting the y=0 reference point.

Notch aperture machining is initiated by activating all of the functions of the fiber optic mill illustrated in FIGS. 13A and 13B. These are the knife motor 153, the gas and slurry jets 162 and 163, and the drive control program of the controller 171.

To begin machining, the drive motor controller 171 retrieves fiber notch depth data from its floppy storage, which are used to maintain or modify the feed rates of the horizontal (x) and vertical (y) axes of the chuck assembly 60. The drive motor control program is initialized with depth data for the notches according to the profile algorithm given in Appendix A, after which the machining process is initiated. The software in the drive motor control 171 operates the stepper motor drive 170 to translate the chuck 160 in the x and y directions to, first, position the ith fiber to be machined with respect to the blade by indexing of the chuck 160 in the x axis. Then the chuck 160 is raised in the y axis to bring the rotating blade 150 in contact with the ith fiber to be machined and to cut a notch with depth $h_i$ as given in Appendix A. Notch machining is completed when the notch data file has been completely addressed. It will be evident to those skilled in the art that the notch data file length equals the total number N of reflective notches to be machined.

When the notches have been made by the machining process just described, the head assembly 149 is demounted from the chuck 160. The chuck 160 moved away from the knife blade to provide the required clearance in the clamps 181 and 182 are removed, thereby freeing the head assembly 149.

During the machining process, excess fiber material and slurry debris are forced into the machined notches. After machining, the head assembly 149 is cleansed by aerosol blasting with ammonium salts, deionized water, transister grade acetone, and high grade ethanol, and is then dried with a clean, warm gas.

Figure 15:
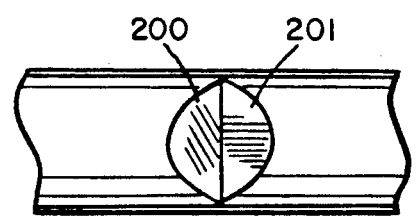
FIGS. 15 and 16A-16C illustrate the morphology of a reflective notch coupler manufactured according to the invention.
Figure 16A:
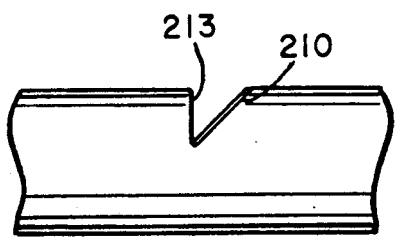
Figure 16C:
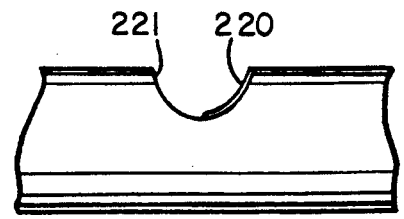

FIG. 15 is the recreation of a magnified photograph of a notch formed in a fiber according to the process just described. As illustrated, the notch of FIG. 15 resembles, in side profile, the notch of FIG. 16B in that the projections of its two faces 200 and 201 form 45° angles with respect to the central axis of the fiber 205. The machining method for forming the notch, and the description of the reflective notch coupler provided above do not limit the two faces of the notch to describing 45 degree angles with respect to the central axis of a fiber. Neither are these descriptions intended to limit the notch faces to being flat, planar surfaces. In fact, the blade of the knife 150 can be machined into a variety of shapes to give corresponding contours to the notch. For example, FIG. 16A illustrates a notch in which the mirrored surface 210 has a non-orthogonal angle with respect to the central axis of the fiber 211, while the transmissive face 213 of the notch is substantially perpendicular to the central axis. In FIG. 16C, the notch faces 220 and 221 are slightly concave, non-planar surfaces.

Figure 17A:
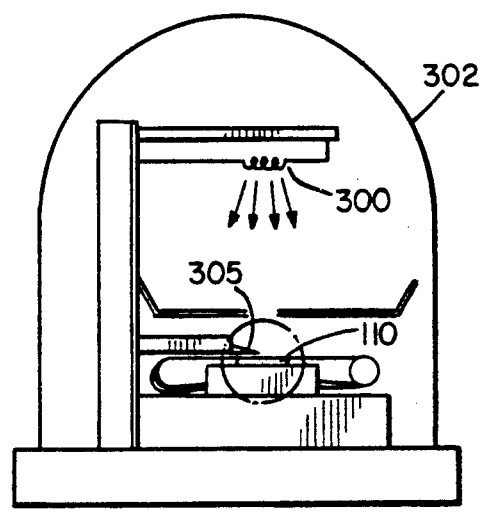
FIGS. 17A-17B illustrate the method of applying reflective coating to the notches.
Figure 17B:
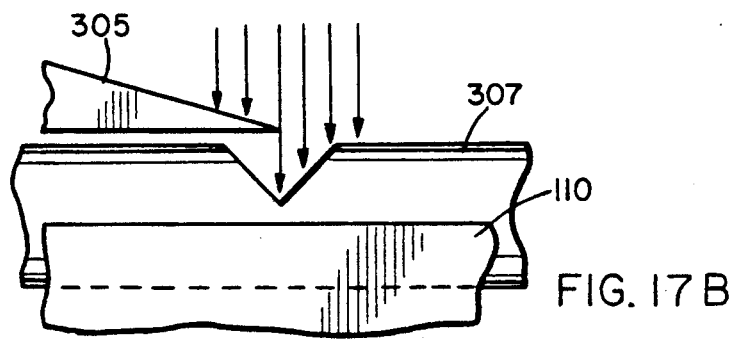

Last, the fabrication of the reflective notch couplers require formation of a reflective surface or layer on one of the notch faces. This step is illustrated in FIGS. 17A and 17B. In the preferred embodiment of the manufacturing method, a reflective layer is formed simultaneously on each of the reflective surfaces of the notches produced as described hereinabove by a vacuum metalization process. This process step essentially involves thin film metallic deposition by vacuum evaporation; it utilizes evaporation of a bulk material on a filament 300 in a vacuum drawn inside an evaporator bell jar 302. Prior to evaporation of the material, a razor edge mask 305 is aligned using visual aids over the exposed fiber portions to shield the transmissive surfaces of the notches from deposition of evaporated material. When the material is evaporated in the vacuum, it is allowed to condense on the relatively cool bonding area of the fiber loops, thereby forming a thin layer on the fibers. This layer extends over the reflective surfaces of the notches. However, the layer is kept off of the transmissive surfaces of the notch couplers by the razor edge 305. Any reflective bulk material which is suitably evaporated can be selected, for example, aluminum, gold, alloys or dielectrics if wavelength selectivity is desired.

APPENDIX A

Figure 18:
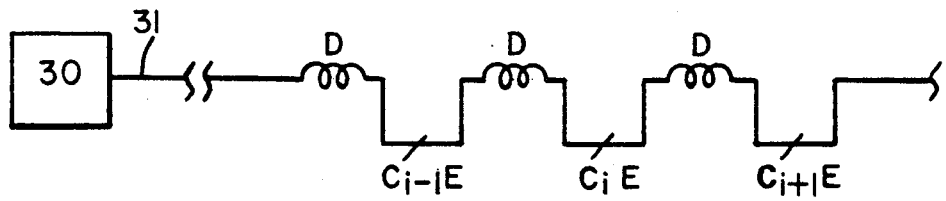
FIG. 18 is a schematic representation and a set of mathematical relationships illustrating the interdependence of coupler operation and fiber geometry.

Calculation of the notch depth $h_i$ for any notch coupler is based upon, first, the amount of optical energy which is desired to be "tapped" from the optical fiber at the reflective notch coupler location hereinafter, the "tap ratio", and by the dimensions of the optical fiber itself. The primary objective driving the calculation of the notch depth is the equalization of magnitude for the train of pulses returned to the transceiver 30 in FIG. 4. Calculation of the magnitude of the pulse return through the reflective notch coupler i will be affected by the magnitude of the illuminating pulse when it propagates past coupler i, the loss inherent in the operation of the coupler itself, including coupling of illumination energy out of the fiber to the coded surface and coupling of a resulting reflection from the coded surface back into the fiber. This loss is referred to as excess loss, E. The loss E is assumed to be equal at each coupler. Further loss is incurred by pulse propagation through each coil delay section. This loss is also assumed equal and is indicated by D. FIG. 18 presents a model of the lumped losses affecting return propagation of a pulse from reflective notch coupler i in the arrangement of FIG. 4. The reflective notch coupler i has a tap ratio $C_i$ which is calculated, based on the assumptions above, to equalize the magnitude of the ith return pulse to the transceiver 30 in FIGS. 4 and 18. In this regard, the tap ratio refers to the amount of optical power coupled by the ith reflective notch coupler, when compared to notch coupler $i-1$. This relationship is illustrated in FIG. 18 by equation (1). Equation (2) illustrates that the roundtrip loss for the ith return pulse is a product sum of the effect of the couplers and D and E losses between the ith coupler and the transceiver.

It is assumed in the operation of the reflective couplers that the illuminating pulse distributes its energy uniformly in the core of the fiber while the pulse is propagating. Therefore, once the tap ratio of the ith coupler is known, it can be expressed simply as the ratio of the area (Ap) of the circular segment projected onto the cross-section of the fiber by the reflective surface of the notch (see FIG. 2) to the total area of the fiber cross-section. This relationship is given in equation (3) of FIG. 18. Once the tap ratio $C_i$ is known, equation (3) can be solved for $A_p$.

Figure 19:
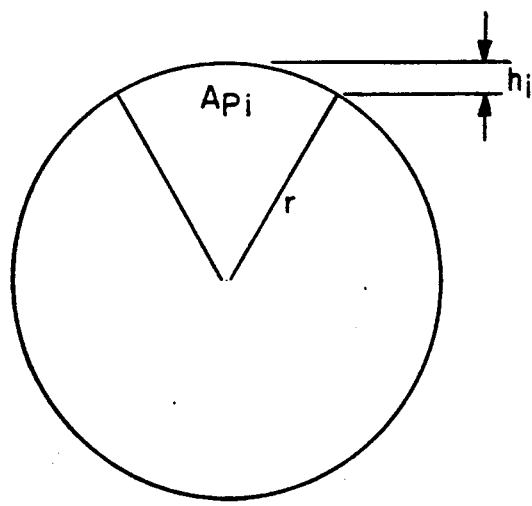
FIG. 19 is a geometrical and mathematical illustration of the interdependence of coupler operation and notch height.

FIG. 19 illustrates how the area of the circular segment projected on the cross-section of fiber is related to $h_i$, the height of the ith notch. This is given in equation (4) illustrated in FIG. 19. The area of the circular segment projected on the circular cross-section of the fiber by the mirrored surface of the ith coupler is denoted as $A_{pi}$, while the radius of the fiber is given by r.

Figure 20:
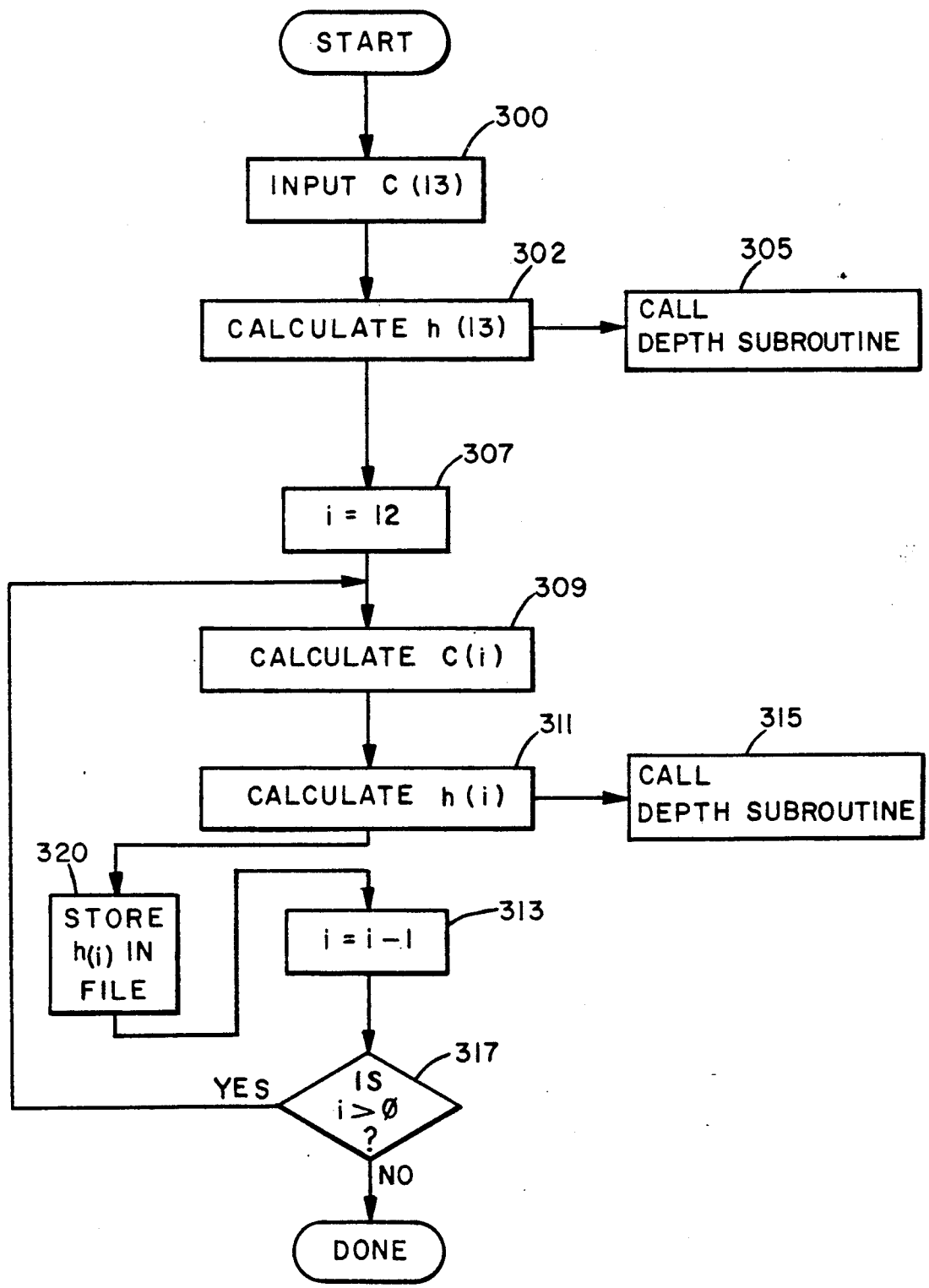
FIGS. 20-22 illustrate numerical procedure for determining the depths of a plurality of notches in a single fiber of diameter r.
Figure 22:
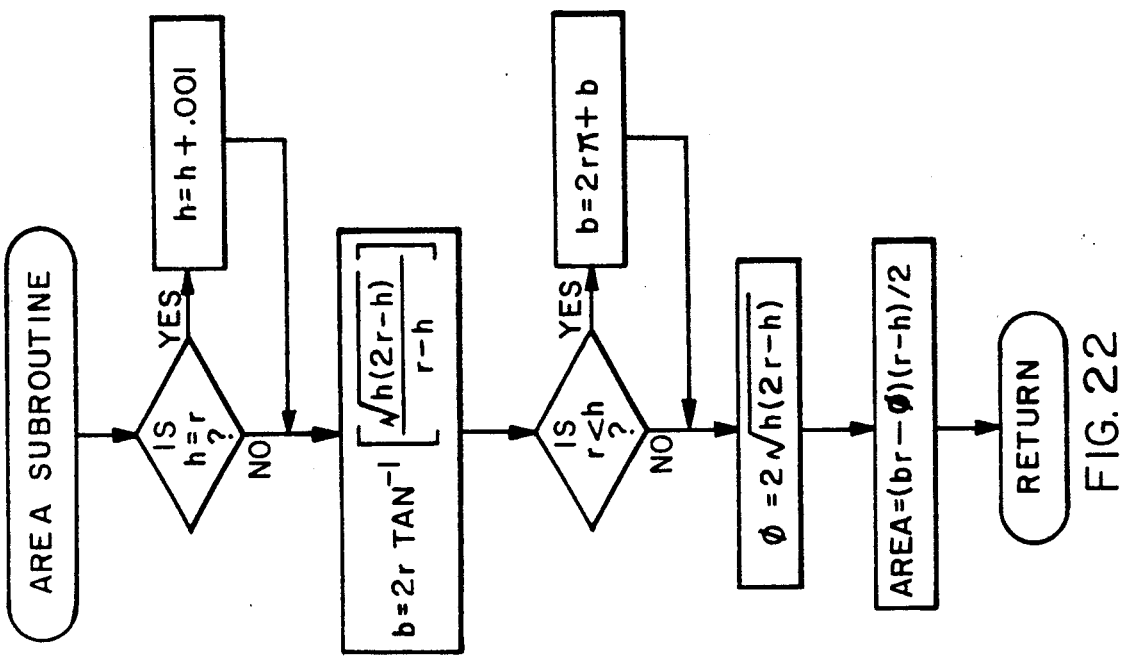
Figure 21:
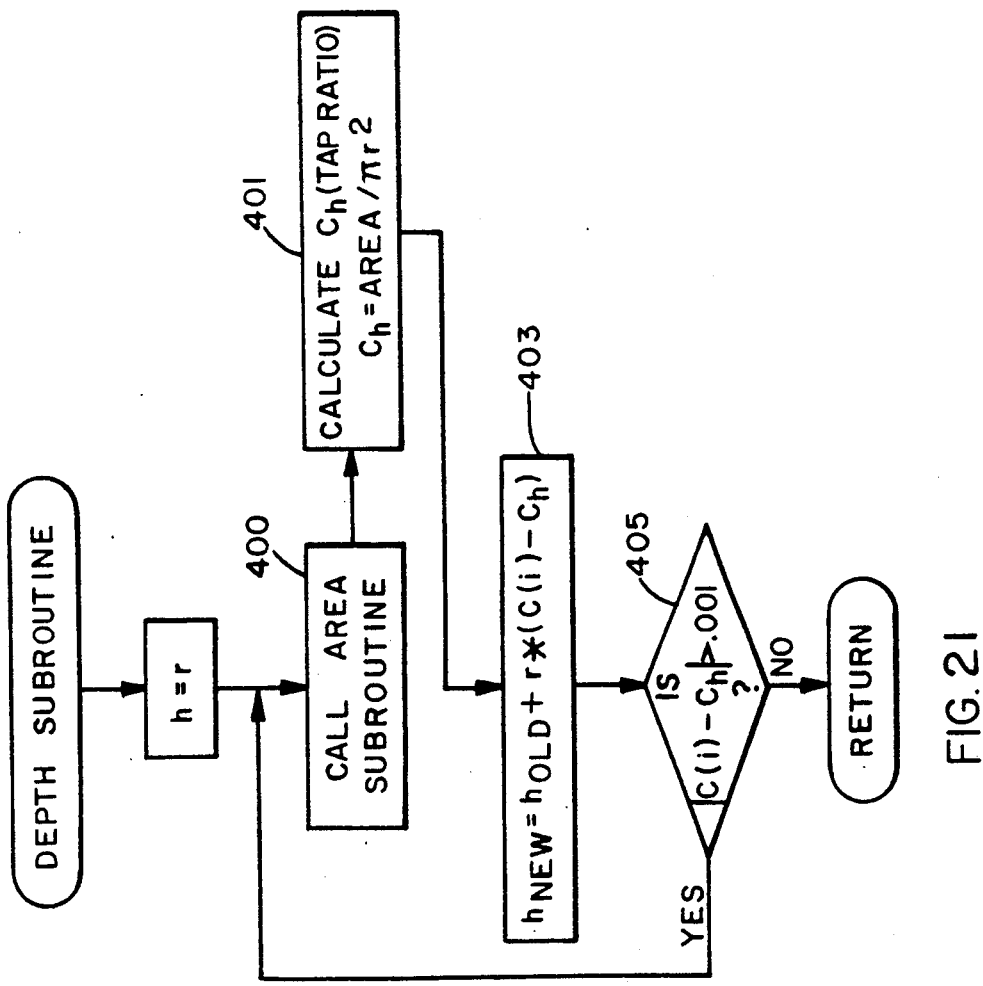

Equation (4) of FIG. 19 provides a relationship between $A_{pi}$ and $h_i$ in which the notch depth for the ith coupler is calculated employing the iterative numerical procedure illustrated in FIGS. 20, 21, and 22. Although not employed here, it is possible that notch depth could be calculated by means of a closed equation for $h_i$ derived from equation (4).

This procedure is based upon calculation of notch depths for a fiber optic read head including 13 reflective notch couplers, with the first coupler encountered by the illuminating pulse being numbered 1 and the last being numbered 13. Also assumed is a fiber radius of 100 microns, with the dimensions in the procedure of FIGS. 20-22 being given in microns and fractions thereof.

The procedure is initialized by assigning a tap ratio of 0.5 and a depth of 50 microns to the thirteenth coupler. This assures that a maximum depth ($h_{13}$) is imposed on the procedure. This depth is arbitrarily chosen to be r/2 (50 microns) for a fiber having a circular cross-section and a radius r. Thus, in step 300, the process is initialized by setting the tap ratio for the thirteenth (furtherest) coupler, $C_{13}$, at 0.5. The notch depth $h_{13}$ for the thirteenth notch coupler is initialized in step 302, which calls a depth subroutine 305, illustrated in FIG. 21. In the depth subroutine, the value for h is initialized to r, the radius of the optical fiber. Next, an area subroutine is called (FIG. 22) which will return a value for the parameter AREA which is used in step 401 of FIG. 21 to calculate a tap ratio $C_h$ based upon a current value of the notch depth ($h_{old}$). The value of $C_h$ is calculated by dividing the value for the parameter AREA returned from the area subroutine (FIG. 22) by the area of the cross-section of the fiber. This value is subtracted from the current value of $C_i$ in step 403 to give a new value for the notch depth. The new value is the old value augmented by the term $r*(C_i-C_h)$. On the first pass through the depth subroutine of FIG. 21 for the thirteenth coupler, the values of $C_i$ and $C_h$ will be equal, the new and old values of h will be equal and the decision 405 will be exited, returning to the main routine (FIG. 20) at step 307. Next, in step 309, the value of the tap ratio for the next reflective notch coupler is calculated using the return loss formula in equation (2) of FIG. 18. Once this value is calculated, the value for the notch depth of the coupler is calculated in step 311 by calling the depth subroutine in step 315.

When the depth subroutine is entered from step 311 of the routine of FIG. 20, will return a value for the AREA parameter that produces a value for $C_h$ in step 401 is larger than the value of $C_i$ calculated in step 309 using equation (2) of FIG. 18. Consequently, the value of the term by which r is multiplied will be negative, thereby producing a value for hnew which is less than the value of $h_{old}$. Convergence of $C_i$ and $C_h$ is tested in decision 405 of FIG. 21, with the absolute value of the difference of the current value for these parameters being tested against 0.001. For so long as the test is beyond this test limit, the depth routine loops back to step 400 and proceeds as described above.

Inspection of FIG. 22 will reveal that, as the value of h grows smaller, the value of the parameter AREA will diminish until the test of decision 405 in FIG. 21 is passed. When the negative exit is taken from decision 405, the index value i is decremented in step 313 of FIG. 20, the current values of $C_i$ and $h_i$ are stored in the file to be provided for control of the CNC mill, and new values of $C_i$ and $h_i$ are calculated again in steps 309 and 311. When i is $h_i$ decremented to zero, the negative exit is taken from 315 and the procedure of FIG. 20 is exited.

While we have described several preferred embodiments of our invention, it should be understood that modifications and adapations thereof will occur to persons skilled in the art. Therefore, the protection afforded our invention should only be limited in accordance with the scope of the following claims.

We claim:
1. A fiber optic coupler, comprising:
   an optical fiber for conducting an optical signal, said optical fiber including a substantially cylindrical elongate core with a central axis and a cladding on the outside of said core;
   an optically reflective first surface in said fiber, said first surface extending from said cladding into said core;
   said optically reflective first surface having a non-orthogonal first angle with respect to said central axis;
   an optically transmissive second surface in said fiber, said second surface extending from said cladding into said core; and
   said second surface meeting said first surface in said core to form an indentation in said fiber, said indentation extending from said cladding into said core.
2. The fiber optic coupler of claim 1, wherein said first angle is non-orthogonal with respect to said central axis.
3. The fiber optic coupler of claim 2, wherein said indentation is a V-shaped notch which extends into said core from said cladding no further than said central axis.
4. An optical transmission mechanism, comprising:
   an optical fiber for conducting an optical signal from an entry aperture, said optical fiber including a core with a central axis and a cladding on the outside of said core;
   a plurality of optical delay means in series in said optical fiber, each delay means for delaying the transmission of optical signals through said optical fiber; and
   a plurality of optical couplers in series in said optical fiber, said optical delay means alternating with said optical couplers in said optical fiber, each of said optical couplers including:
      an optically reflective first surface in said optical fiber, said first surface extending from said cladding into said core;
      said optically reflective first surface having a non-orthogonal first angle with respect to said central axis;
      an optically transmissive second surface in said fiber, said second surface extending from said cladding to said core; and
      said second surface meeting said first surface in said core to form an indentation in said fiber, said indentation extending from said cladding into said core.
5. The optical transmission mechanism of claim 4 wherein each of said optical delay means is a respective loop of said fiber.
6. The optical transmission mechanism of claim 4 wherein said each of said couplers has a unique value for a parameter, h, which is the depth of the indentation forming said each of said couplers.
7. A fiber optic coupler comprising:
   a substantially cylindrical optical fiber for conducting light;
   a notch in the optical fiber with a first and second surface which meet within the fiber; and
   a reflective means on the first surface for reflectively transferring from the fiber light which is transmitted through the second surface.
8. The fiber optic coupler of claim 7, wherein the fiber has a core with a central axis, the reflective means reflectively transferring said light without said light crossing the central axis.
9. A fiber optic read head for reading optical signals from an optically-encoded surface, said optically encoded surface including a plurality of substantially parallel coding tracks in which an optical code is represented by optically reflective surface portions in combination with optically non-reflective surface portions, said optical read head comprising:
   a carrier piece;
   a plurality of alignment grooves in said carrier piece, said alignment grooves disposed in an arrangement corresponding to said coding tracks;
   a single optical fiber coiled into an elongate cylinder, said optical fiber including a core with a central axis and a cladding on the outside of said core;
   a plurality of fiber loops extending from said elongate cylinder, each of said fiber loops being attached to said carrier piece by being held in a respective one of said alignment grooves; and
   an optical coupler in each of said fiber loops at a location on said carrier piece adjacent the respective groove in which said each of said fiber loops is held; each of said optical couplers including:
      an optically reflective first surface in said optical fiber, said first surface extending from said cladding into said core;
      said optically reflective first surface having a non-orthogonal first angle with respect to said central axis;
      an optically transmissive second surface in said fiber, said second surface extending into said cladding into said core; and
      said second surface meeting said first surface in said core to form an indentation in said fiber, said indentation extending from said cladding into said core.
10. The fiber optic read head of claim 9 wherein a parameter h is an indentation depth taken radially in said fiber from said cladding toward said central axis and $h_i$, the value of h for the indentation in the ith loop, is less than, or equal to, the radius of said fiber.
11. The fiber optic read head of claim 10 wherein $h_i$ is less than $h_{i+i}$, the value of h for the indentation in a loop adjacent said ith loop.
12. The fiber optic read head of claim 9 including N loops, each of said N loops including a respective one of said indentations, wherein the indentation of the ith loop couples a portion $C_i$ of light travelling in said fiber, such that:

$$Chd\ i = \tfrac{1}{2}\{b_i r - P_i(r - h_i)\}\pi r^2,$$

wherein:
$P_i = \{4(2h_i r - h_i^2)^{\frac{1}{2}}\},$
and
$b_i = 2r\arctan\{(2rh_i - h_i^2)^{\frac{1}{2}}/(r - h_i)\},$
where $h_i$ is the depth of the indentation of the ith loop and r is the radius of said fiber.

13. The fiber optic read head of claim 12 wherein $$C_i \geq C_{i+1}.$$

14. A method of manufacturing an optical coupler in an optical fiber which includes a core with a central axis and a cladding applied to said core, said method comprising the steps of:

cutting said fiber tangentially to form a notch in said fiber, said notch extending through the cladding into the core of said optical fiber, said notch including a first and a second surface, said first surface having a non-orthogonal angle with respect to said central axis; and attaching an optically reflective material to substantially all of said first surface.

15. A method of manufacturing a plurality of optical couplers in an optical fiber, said optical fiber including a core with a radius r and a central axis, and a cladding applied to said core, said method comprising the steps of:

coiling said optical fiber;

while coiling said fiber, extending N elongate, substantially parallel sections of said optical fiber;

in each of said N parallel sections, cutting said fiber to form a notch for output coupling a portion C of light traveling in said fiber, the notch in each section extending through the cladding and into the core of said optical fiber and including a first surface and a second surface, said first surface having a non-orthogonal angle with respect to said central axis;

in section i of said N sections, the step of forming including forming a notch having a depth $h_i$ wherein:

$$C_i = \tfrac{1}{2}\{b_i r - p_i(r - h_i)\}\pi r^2$$

such that:
$p_i = \{4(2h_i r - h_i^2)^{\frac{1}{2}}\},$
$b_i = 2r\arctan\{(2rh_i - h_i^2)^{\frac{1}{2}}/(r - h_i)\},$
and
$C_i < C_{i-1};$ and forming an optically reflective sheet on the first surface of each notch.

16. A method of manufacturing a plurality of optical couplers in an optical fiber, said optical fiber including a cylindrical core with a central axis and a cladding on the outside of the core, the method employing a cutting wheel and comprising the steps of:

(1) arranging a plurality of fiber sections of the fiber in parallel on a work surface;

(2) positioning the cutting wheel at a distance from the work surface such that the edge of the cutting wheel is located below the cladding and above the central axis of a first fiber section;

(3) cutting the first fiber section tangentially with the edge of the cutting wheel to form an indentation in the first fiber section, the indentation including a first and second surface which meet in the core above the central axis;

(4) adjusting the distance between the cutting wheel and the work surface such that the edge of the cutting wheel is located below the cladding and above the central axis of a second fiber section; and (5) cutting the second fiber section tangentially with the edge of the cutting wheel to form an indentation in the second fiber section including a first and second surface which meet in the core above the central axis.

17. The method of claim 16 wherein the second fiber section is adjacent the first fiber section.

18. The method of claim 16 wherein the step of positioning positions the edge of the cutting wheel at a position which is a first distance above the central axis and the step of adjusting positions the edge of the cutting wheel at a position which is a second distance above the central axis, the first and second distances being unequal.

19. The method of claim 16 wherein the sequence of steps (4) and (5) is performed for each of the remaining fiber sections.

20. The method of claim 19 further including the steps of placing a layer of optically reflective material on the first surfaces of the indentations in the fiber sections.

* * * * *